US012179098B2

(12) United States Patent
Meng et al.

(10) Patent No.: US 12,179,098 B2
(45) Date of Patent: Dec. 31, 2024

(54) RENDERING METHOD AND APPARATUS

(71) Applicant: HUAWEI TECHNOLOGIES CO., LTD., GuangDong (CN)

(72) Inventors: Xian Meng, Hangzhou (CN); Pan Zhang, Hangzhou (CN); Kang Zhou, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 337 days.

(21) Appl. No.: 17/895,562

(22) Filed: Aug. 25, 2022

(65) Prior Publication Data

US 2022/0409999 A1 Dec. 29, 2022

Related U.S. Application Data

(63) Continuation of application No. PCT/CN2020/113666, filed on Sep. 7, 2020.

(30) Foreign Application Priority Data

Feb. 25, 2020 (CN) .......................... 202010118171.X

(51) Int. Cl.
*G09G 5/395* (2006.01)
*A63F 13/358* (2014.01)
(Continued)

(52) U.S. Cl.
CPC ............ *A63F 13/358* (2014.09); *A63F 13/77* (2014.09); *G06T 15/005* (2013.01)

(58) Field of Classification Search
CPC .... G06F 3/1454; G06F 3/1415; G06F 3/1462; G06T 15/005; G09G 2320/0252; G09G 2340/0435; G09G 2350/00; G09G 5/395; H04N 21/2408; H04N 21/24; H04N 21/64738; H04N 21/64746
See application file for complete search history.

(56) References Cited

U.S. PATENT DOCUMENTS

2011/0263332 A1 10/2011 Mizrachi
2018/0345140 A1 12/2018 Posin

FOREIGN PATENT DOCUMENTS

CN 104618733 A 5/2015
CN 108022286 A 5/2018
(Continued)

*Primary Examiner* — Hau H Nguyen
(74) *Attorney, Agent, or Firm* — Rimon PC

(57) ABSTRACT

Before a network jitter occurs, a server receives operation instructions from an electronic device, generates a plurality of first rendering instruction streams based on the operation instructions, sends the plurality of first rendering instruction streams to the electronic device, and generates and stores one or more first rendering contexts for one or more first rendering instruction streams in the plurality of first rendering instruction streams. When the network jitter occurs, the server generates a second rendering instruction stream based on received operation instructions, and generates and stores a second rendering context based on the second rendering instruction stream. After the recovery from the network jitter, the server sends a set of rendering context differences to the electronic device. In this way, network transmission traffic after the recovery from the network jitter is reduced, transmission and processing delays are also reduced, and user experience is improved.

14 Claims, 17 Drawing Sheets

(51) Int. Cl.
*A63F 13/77* (2014.01)
*G06T 15/00* (2011.01)

(56) References Cited

FOREIGN PATENT DOCUMENTS

| | | |
|---|---|---|
| CN | 108310766 A | 7/2018 |
| CN | 110035328 A | 7/2019 |
| CN | 110083324 A | 8/2019 |
| CN | 110227259 A | 9/2019 |
| CN | 110711380 A | 1/2020 |
| CN | 110740380 A | 1/2020 |

RENDERING METHOD AND APPARATUS

CROSS-REFERENCE TO RELATED APPLICATIONS

This application is a continuation of International Application No. PCT/CN2020/113666, filed on Sep. 7, 2020, which claims priority to Chinese Patent Application No. 202010118171.X, filed on Feb. 25, 2020. The disclosures of the aforementioned applications are hereby incorporated by reference in their entireties.

TECHNICAL FIELD

Embodiments of this application relate to the cloud computing field, and in particular, to a rendering method in a cloud game scenario.

BACKGROUND

Cloud games are games based on cloud computing and relying on network transmission. Users click and play cloud games on client terminals without experiencing download and installation processes. 5G features high bandwidth and low latency. It is expected to break, for cloud games, the bottlenecks of limited image quality due to insufficient bandwidth and not being able to meet the requirement of instant gaming due to high latency. Therefore, the era of 5G is bound to boost the development of cloud games. Typical implementation scenarios of cloud game technologies include video cloud games and instruction cloud games.

(1) Video Cloud Games

A cloud server receives operation instructions from a terminal device, and a central processing unit (CPU) or a graphics processing unit (GPU) of the server completes computation. Then, a video stream is transmitted to the terminal (including a laptop computer, a tablet computer, a mobile phone, or the like) through a network for display. In a video cloud game scenario, a player's game terminal does not need to have powerful graphics computing and data processing capabilities, but only needs to have basic streaming playback capabilities and capabilities of obtaining player-input instructions and sending them to a cloud server.

(2) Instruction Cloud Games

All logic is computed by using a cloud server to form rendering instructions of an Open Graphics Library (OpenGL) or a Web Graphics Library (WebGL). Then, the rendering instructions are transmitted to a terminal device through a network. The terminal device parses and executes an instruction stream. In this case, GPU capabilities of the terminal device are fully utilized. For the same image quality, instruction cloud games have lower network bandwidth overheads and lower costs than a video cloud game solution, and do not incur rendering overheads of a GPU of the cloud server and the like. However, an instruction cloud game scenario has low availability under poor network conditions.

FIG. 1 shows a process in an instruction cloud game scenario without network jitter. In other words, a server receives operation instructions from a terminal, enables a CPU to execute the logic of an application program to generate rendering instruction streams including resource loading, rendering pipeline execution, and display, and sends the rendering instruction streams to the terminal; and the terminal receives the rendering instruction streams, and enables a GPU to execute the rendering instruction streams and display an image corresponding to the application program.

FIG. 2 shows an accumulation of rendering instruction streams due to delays during a network jitter. When a network jitter occurs, the data volume of accumulated rendering instruction streams increases linearly with jitter duration. After recovery from the network jitter, the service end sends the rendering instruction streams accumulated during the network jitter to the terminal at the same time, and the terminal executes the rendering instruction streams in sequence. The terminal can continue to execute rendering instruction streams that are generated after recovery from the network jitter only after executing the rendering instruction streams accumulated during the network jitter. This causes high transmission and processing delays of the rendering instruction streams. As a result, rendering consumes much time on the terminal, a rendering result of a latest frame cannot be presented to the user in time, and the user experiences a high delay. Therefore, how to reduce transmission and processing delays of rendering instruction streams and improve user experience becomes an urgent problem to be resolved.

SUMMARY

This application provides a rendering method and apparatus, applied to the cloud computing field, to resolve the following problem in an instruction cloud game scenario:

to reduce transmission and processing delays of rendering instruction streams and improve user experience in the case of a network jitter.

According to a first aspect, an embodiment of this application provides a rendering method. The method is applied to a server and includes: Before a network jitter occurs on a network, the server successively receives operation instructions from an electronic device through the network, generates a plurality of first rendering instruction streams based on the operation instructions, and sends the plurality of first rendering instruction streams to the electronic device; and the server generates and stores one or more first rendering contexts for one or more first rendering instruction streams in the plurality of first rendering instruction streams, where the one or more first rendering context one-to-one corresponds to the one or more first rendering instruction streams, and the first rendering context includes a corresponding first rendering instruction stream or information used for restoring a corresponding first rendering instruction stream; when a network jitter occurs, the server continues to generate a second rendering instruction stream based on received operation instructions, and generates and stores a second rendering context based on the second rendering instruction stream, where the second rendering context includes the second rendering instruction stream or information used for restoring the second rendering instruction stream, and the second rendering instruction stream is a rendering instruction stream most recently generated before recovery from the network jitter; and after recovery from the network jitter, the server sends a set of rendering context differences to the electronic device, where the set of rendering context differences includes one or more rendering context differences, wherein the one rendering context difference is the difference between the second rendering context and one of the first rendering contexts, and the electronic device uses the set of rendering context differences to obtain the second rendering instruction streams.

This application may be applied to a scenario in which separate rendering is implemented by using an instruction stream solution, in other words, a server receives operation instructions from an electronic device through a network, generates rendering instruction streams based on the operation instructions, and sends the rendering instruction streams to the electronic device connected to the server, so that the electronic device that receives the rendering instruction streams performs graphics rendering. However, when a network jitter occurs, a large quantity of rendering instruction streams are accumulated because the rendering instruction streams cannot be sent. After recovery from the network jitter, the large quantity of rendering instruction streams are to be sent from the server side to the electronic device. After the sending, the large quantity of rendering instruction streams are to be executed on the electronic device side. This causes high transmission and processing delays of the rendering instruction streams. As a result, rendering consumes much time in the electronic device, the rendering result of the latest frame cannot be presented to a user in time, and the user experiences a high delay. By using the method, the server may send a set of rendering context differences to the electronic device, where the set of rendering context differences includes one or more rendering context differences, wherein the one rendering context difference is a difference between the second rendering context and one first rendering context. Therefore, the electronic device can obtain, based on the set of rendering context differences, a rendering instruction stream most recently generated by the server before recovery from the network jitter, thereby implementing synchronization between the server and the electronic device. Because the quantity of rendering instruction streams corresponding to the set of rendering context differences is greatly reduced compared with the quantity of rendering instruction streams accumulated during the network jitter, network traffic is dramatically reduced in the process of sending the rendering instruction streams to the electronic device, and accordingly, the delay in executing the rendering instruction streams by the electronic device is significantly reduced. In other words, both transmission and processing delays are reduced. Therefore, network transmission traffic is reduced, transmission and processing delays are reduced, and user experience is improved.

In some possible implementations, the operation instructions may alternatively come from another device, or may be generated by the server itself.

In a possible implementation, a rendering context may be generated and stored on the server based on a rendering instruction stream. The rendering context records information required for image rendering, including the rendering instruction stream or information used for restoring the rendering instruction stream. For example, in OpenGL, an OpenGL rendering context records all information required for OpenGL rendering. It is a large structure that records states and state attributes that are set by OpenGL function calling, such as color currently used for rendering, whether there is illumination calculation, and a light source turned on. It may be understood that, in this implementation, the generation and storage of a rendering context may be implemented by a logical entity different from an application program app service end running on the server, for example, a context tracking module. In this scenario, the context tracking module may obtain a rendering instruction stream from the app service end and generate and store a rendering context based on the rendering instruction stream.

In another possible implementation, a rendering context may be alternatively generated and stored on another server or another type of device. This is not limited in this application.

In some possible implementations, before generating and storing any first rendering context in the one or more first rendering contexts, the server determines a generated first rendering instruction stream as a rendering instruction stream corresponding to data of an image frame, or the server determines a first rendering instruction stream as a target rendering instruction stream, where the target rendering instruction stream is prestored on the server, for example, draw instructions or swap instructions.

In a possible implementation, the server may periodically perform an action of generating and storing one or more first rendering contexts.

In another possible implementation, the server may alternatively generate and store the one or more first rendering contexts after generating one or more rendering instruction streams. A quantity of rendering instruction streams are prestored on the server. For example, the server generates and stores the one or more first rendering contexts after generating five rendering instruction streams. The generation and storage of the one or more first rendering contexts is a preparation for subsequent calculation of a set of rendering context differences. The server sends the set of rendering context differences to the electronic device after recovery from the network jitter, so that the electronic device can obtain, based on the set of rendering context differences, a rendering instruction stream most recently generated by the server before recovery from the network jitter, thereby implementing synchronization between the server and the electronic device.

In a possible implementation, the server generates a third rendering instruction stream and generates a third rendering context based on the third rendering instruction stream, where the third rendering context includes the third rendering instruction stream or information used for restoring the third rendering instruction stream, and the third rendering instruction stream is the 1st rendering instruction stream generated after the server receives operation instructions from the electronic device; and the server sets a baseline snapshot, where the baseline snapshot is the third rendering context.

In a possible implementation, the server receives a rendering instruction stream response sent by the electronic device, where the rendering instruction stream response includes an instruction stream number of a rendering instruction stream most recently received by the electronic device; and the server updates the baseline snapshot to a first rendering context corresponding to the received instruction stream number.

In a possible implementation, after receiving the rendering instruction stream response, the server deletes other first rendering contexts stored on the server.

In a possible implementation, any first rendering context in the one or more first rendering contexts may be stored by storing the difference between the any first rendering context and the baseline snapshot. It may be understood that if the difference between the any first rendering context and the baseline snapshot is stored, the storage space of the server can be saved.

In another possible implementation, an entire first rendering context may be directly stored. In this implementation, the baseline snapshot may not be set.

In a possible implementation, after recovery from the network jitter, the server obtains an instruction stream number of the rendering instruction stream last executed by the electronic device before the network jitter occurs. An obtaining manner may be: The server proactively queries the electronic device after detecting that recovery from the network jitter, and the electronic device sends, to the server, the instruction stream number of the rendering instruction stream last executed before the network jitter occurs; or after detecting that recovery from the network jitter, the electronic device proactively reports, to the server, the instruction stream number of the rendering instruction stream last executed before the network jitter occurs. Correspondingly, in this implementation, the sending a set of rendering context differences after recovery from the network jitter includes: sending a difference between the second rendering context and a first rendering context corresponding to the instruction stream number.

After recovery from the network jitter, the server sends the set of rendering context differences to the electronic device. In a possible implementation, the server sends a set of differences between the second rendering context and each first rendering context in the one or more first rendering contexts. In another possible implementation, the server sends a set of differences between a difference between the second rendering context and the baseline snapshot, and a sum of differences between the any first rendering context and the baseline snapshot. Corresponding to this implementation, a manner of storing a first rendering context is the storing a difference between the any first rendering context and the baseline snapshot, as described above.

In a possible implementation, the set of rendering context differences sent by the server after recovery from the network jitter may be in a user-defined message format. It may be understood that if a rendering context difference sent by the server is in the user-defined message format, the electronic device needs to convert the user-defined format of the rendering context difference into a rendering instruction stream format.

In a possible implementation, the set of rendering context differences sent by the server after recovery from the network jitter may be in a rendering instruction stream format.

According to a second aspect, an embodiment of this application provides a rendering method. The method is applied to an electronic device and includes:

Before a network jitter occurs on a network, the electronic device receives a first rendering instruction stream from a server, where the first rendering instruction stream is used for executing image rendering to display an image; the electronic device sends a rendering instruction stream response to the server, where the rendering instruction stream response includes an instruction stream number of a rendering instruction stream most recently received by the electronic device; and after recovery from the network jitter, the electronic device receives a set of rendering context differences from the server, and parses some or all rendering context differences in the set of rendering context differences to obtain a rendering instruction stream most recently generated by the server before recovery from the network jitter.

In some implementations, the method further includes: sending operation instructions to the server, where the operation instructions are used to instruct the server to run an application program.

This application may be applied to a scenario in which separate rendering is implemented by using an instruction stream solution, in other words, an electronic device sends operation instructions to a server through a network, the server generates rendering instruction streams based on the operation instructions and sends the rendering instruction streams to the electronic device, and the electronic device performs graphics rendering. However, when a network jitter occurs, a large quantity of rendering instruction streams are accumulated because the rendering instruction streams cannot be sent. After recovery from the network jitter, the large quantity of rendering instruction streams are to be sent from the server side to the electronic device. After the sending, the large quantity of rendering instruction streams are to be executed on the electronic device side, which causes high transmission and processing delays of the rendering instruction streams. As a result, rendering consumes much time in the electronic device, a rendering result of a latest frame cannot be presented to a user in time, and the user experiences a high delay. By using the method, the server may send a set of rendering context differences to the electronic device, where the set of rendering context differences includes one or more rendering context differences, wherein the one rendering context difference is a difference between the second rendering context and one first rendering context. Therefore, the electronic device can obtain, based on the set of rendering context differences, a rendering instruction stream most recently generated by the server before recovery from the network jitter, thereby implementing synchronization between the server and the electronic device. Because the quantity of rendering instruction streams corresponding to the set of rendering context differences is greatly reduced compared with the quantity of rendering instruction streams accumulated during the network jitter, network traffic is dramatically reduced in a process of sending the rendering instruction streams to the electronic device, and accordingly, a delay in executing the rendering instruction streams by the electronic device is significantly reduced. In other words, both transmission and processing delays are reduced. Therefore, network transmission traffic is reduced, transmission and processing delays are reduced, and user experience is improved.

In some possible implementations, before sending the rendering instruction stream response to the server, the electronic device determines the received first rendering instruction stream as a rendering instruction stream corresponding to data of an image frame, or the electronic device determines the received first rendering instruction stream as a target rendering instruction stream, where the target rendering instruction stream is prestored in the electronic device. For example, the electronic device receives draw instructions or swap instructions and sends a rendering instruction stream response to the server.

In a possible implementation, the electronic device may send a rendering instruction stream response to the server after receiving one or more rendering instruction streams, for example, after receiving five rendering instruction streams. A quantity of rendering instruction streams are prestored in the electronic device.

In a possible implementation, the electronic device periodically performs an action of sending a rendering instruction stream response.

In a possible implementation, one or more rendering context differences in the set of rendering context differences received by the electronic device may be in a user-defined message format. For example, the rendering context difference is in an information format that is used for restoring the rendering instruction stream most recently generated by the server before recovery from the network jitter. If the rendering context difference in the set of rendering context differences received by the electronic device is in the user-defined format, the electronic device converts the user-defined format of the rendering context difference into a rendering instruction stream format. In other words, when the rendering context difference is in the information format that is used for restoring the rendering instruction stream most recently generated by the server before recovery from the network jitter, the electronic device converts the rendering context difference into the rendering instruction stream format.

In a possible implementation, a rendering context difference received by the electronic device may be in a rendering instruction stream format.

In a possible implementation, after recovery from the network jitter, the electronic device proactively reports, to the server, an instruction stream number of the rendering instruction stream last executed before the network jitter occurs.

In a possible implementation, after recovery from the network jitter, the electronic device sends, to the server in response to a query instruction from the server, the instruction stream number of the rendering instruction stream last executed before the network jitter occurs.

After receiving the set of rendering context differences from the server, the electronic device parses some or all rendering context differences in the set of rendering context differences. The parsing some or all rendering context differences in the set of rendering context differences includes: selecting a rendering context difference that is the closest to the rendering instruction stream last executed before the network jitter occurs, and parsing and executing the rendering context difference that is the closest to the rendering instruction stream last executed before the network jitter occurs.

In a possible implementation, after the electronic device receives the set of rendering context differences from the server, if the set of rendering context differences is a difference between the second rendering context obtained after recovery from the network jitter and a first rendering context corresponding to the instruction stream number of the rendering instruction stream last executed by the electronic device before the network jitter occurs, the electronic device determines whether an instruction stream number in the rendering context difference is consistent with the instruction stream number last executed by the electronic device. If they are consistent, the rendering context difference is parsed. In this manner, the server needs to send only one rendering context difference, thereby reducing transmission traffic between the server and the electronic device.

In a possible implementation, after the electronic device receives the set of rendering context differences from the server, if the set of rendering context differences is a set of differences between the second rendering context and each first rendering context in the one or more first rendering contexts, the electronic device needs to select one of the rendering context differences for parsing. In this implementation, the electronic device may search, based on an instruction stream number, whether instruction stream numbers in all rendering context differences on the server include the instruction stream number last executed by the electronic device. If the instruction stream number last executed by the electronic device is included, the electronic device selects a rendering context difference corresponding to the instruction stream number for parsing. In this implementation, to increase a search hit rate, after receiving rendering instruction streams, the electronic device first caches a rendering instruction stream between two first rendering contexts without parsing, and then performs one-time parsing when a next rendering context is obtained, thereby ensuring integrity after recovery from the network jitter. It may be understood that in this implementation, the electronic device needs to record a first rendering context and store a rendering instruction stream between two first rendering contexts. A manner in which the electronic device stores a first rendering context may be consistent with the foregoing manner in which the server stores a first rendering context, may be querying the server for storage of a first rendering context by using a new message, or may be that the server notifies, by using a new message, the electronic device of storage of a first rendering context.

In another possible implementation, after the electronic device receives the set of rendering context differences from the server, if the set of rendering context differences is a set of differences between the second rendering context and each first rendering context in the one or more first rendering contexts, the electronic device needs to select one of the rendering context differences for calculation and parsing. The electronic device finds, based on the instruction stream number of the rendering instruction stream last executed before the network jitter occurs, a first rendering context the closest to the instruction stream number, and calculates a context difference between a rendering context in the electronic device obtained during the network jitter and the first rendering context the closest to the instruction stream number, thereby obtaining a difference between the rendering context in the electronic device obtained during the network jitter and the second rendering context. It may be understood that in this implementation, the electronic device needs to record a first rendering context and the instruction stream number of the rendering instruction stream last executed by the electronic device. A manner in which the electronic device stores a first rendering context may be consistent with the foregoing manner in which the server stores a first rendering context, may be querying the server for storage of a first rendering context by using a new message, or may be that the server notifies, by using a new message, the electronic device of storage of a first rendering context. Different from the foregoing implementation, in this implementation, after receiving a rendering instruction stream, the electronic device may execute the rendering instruction stream in real time and does not need to store a rendering instruction stream between two first rendering contexts. Compared with the foregoing solution, storage space of the electronic device is saved, and the following problem can be avoided: a rendering instruction stream is not executed in real time.

According to a third aspect, an embodiment of this application provides a rendering apparatus. The apparatus includes corresponding modules configured to perform the method/operations/steps/actions described in the first aspect.

The foregoing apparatus may be a server, or may be an apparatus (for example, a chip, or an apparatus that can work together with a server) that is in the server and that is configured to perform graphics rendering.

The module included in the graphics rendering apparatus may be implemented by using a hardware circuit, software, or a combination of a hardware circuit and software.

According to a fourth aspect, an embodiment of this application provides a rendering apparatus. The apparatus includes corresponding modules configured to perform the method/operations/steps/actions described in the second aspect.

The apparatus may be an electronic device, or may be an apparatus (for example, a chip, or an apparatus that can match the electronic device for use) configured to perform graphics rendering in the electronic device.

The module included in the graphics rendering apparatus may be implemented by using a hardware circuit, software, or a combination of a hardware circuit and software.

According to a fifth aspect, an embodiment of this application provides a graphics rendering apparatus. The apparatus includes a processor, where the processor is configured to invoke program code stored in a memory to execute some or all operations in any implementation of the first aspect.

In the foregoing apparatus, the memory storing the program code may be located inside the graphics rendering apparatus (in addition to the processor, the graphics rendering apparatus may further include the memory), or may be located outside the graphics rendering apparatus (which may be a memory of another device). Optionally, the memory is a non-volatile memory.

When the graphics rendering apparatus includes the processor and the memory, the processor and the memory may be coupled together.

According to a sixth aspect, an embodiment of this application provides a graphics rendering apparatus. The apparatus includes a processor, where the processor is configured to invoke program code stored in a memory to execute some or all operations in any implementation of the second aspect.

In the foregoing apparatus, the memory storing the program code may be located inside the graphics rendering apparatus (in addition to the processor, the graphics rendering apparatus may further include the memory), or may be located outside the graphics rendering apparatus (which may be a memory of another device). Optionally, the memory is a non-volatile memory.

When the graphics rendering apparatus includes the processor and the memory, the processor and the memory may be coupled together.

According to a seventh aspect, an embodiment of this application provides a computer-readable storage medium, where the computer-readable storage medium stores program code, and the program code includes instructions used to perform some or all operations in the method described in any one of the foregoing aspects. Optionally, the computer-readable storage medium is located inside an electronic device, and the electronic device may be an apparatus that can perform graphics rendering.

According to an eighth aspect, an embodiment of this application provides a computer program product. When the computer program product runs on a communications apparatus, the communications apparatus is enabled to execute some or all operations of the method described in any one of the foregoing aspects.

According to a ninth aspect, an embodiment of this application provides a chip. The chip includes a processor, and the processor is configured to perform some or all operations in the method described in any one of the foregoing aspects.

According to a tenth aspect, an embodiment of this application provides a system, including the foregoing electronic device and the foregoing server.

BRIEF DESCRIPTION OF DRAWINGS

To describe the technical solutions in embodiments of this application or in the conventional technology more clearly, the following briefly describes the accompanying drawings required for describing embodiments or the conventional technology. It is clearly that the accompanying drawings in the following description show some embodiments of this application, and a person of ordinary skill in the art may still derive other drawings from these accompanying drawings without creative efforts.

DESCRIPTION OF EMBODIMENTS

The following clearly describes the technical solutions in embodiments of this application with reference to the accompanying drawings in embodiments of this application. Clearly, the described embodiments are some but not all of embodiments of this application. All other embodiments obtained by a person of ordinary skill in the art based on embodiments of this application without creative efforts shall fall within the protection scope of this application.

In the description of embodiments of this application, unless otherwise stated, "a plurality of" means two or more than two. The term "and/or" or the character "/" in this application is merely an association relationship for describing associated objects, and indicates that three relationships may exist. For example, A and/or, or A/B may indicate the following three cases: Only A exists, both A and B exist, and only B exists. In the description of embodiments of this application, a context and a rendering context have a same meaning, and a context difference and a rendering context difference have a same meaning.

For ease of understanding, the following uses a "restoration point" to represent a "first rendering context" stored on the foregoing server, and uses a "latest rendering context" to represent the "second rendering context". A terminal in embodiments is one form of the electronic device mentioned above.

The rendering method provided in embodiments of this application is mainly applied to a scenario in which an application program execution environment is separated from a terminal. To better describe embodiments, a cloud game is used as an example for description.

Figure 1:
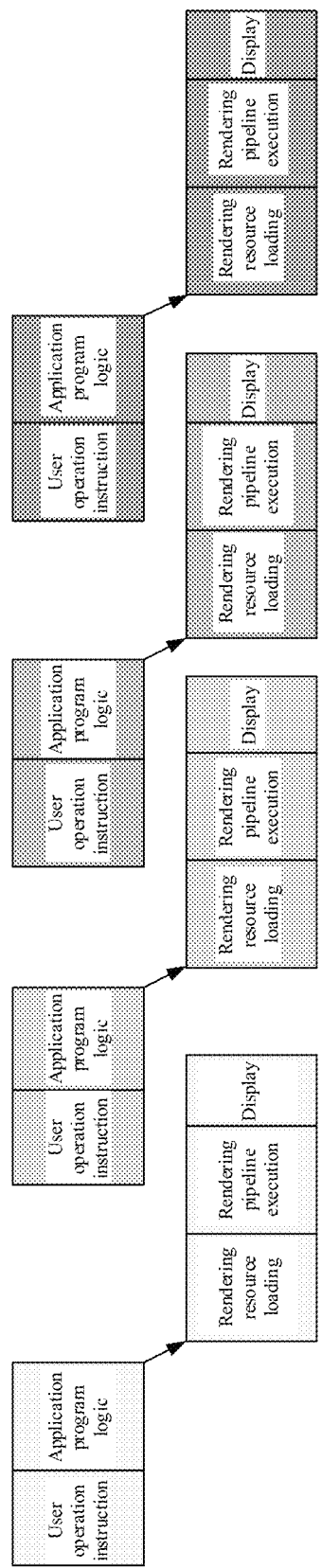
FIG. 1 is a schematic flowchart of processing rendering instruction streams when no network jitter occurs according to an embodiment of this application.
Figure 2:
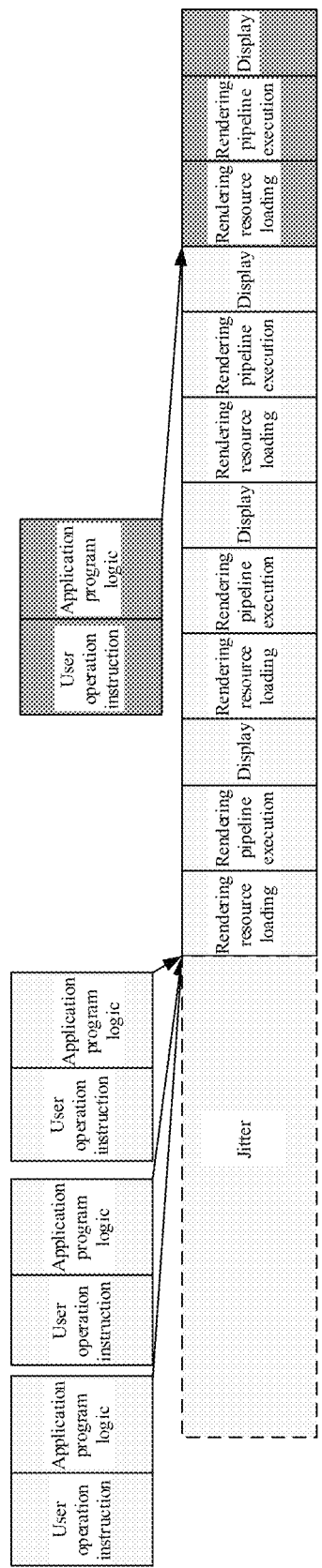
FIG. 2 is a schematic diagram of accumulation of rendering instruction streams when a network jitter occurs according to an embodiment of this application.
Figure 3A:
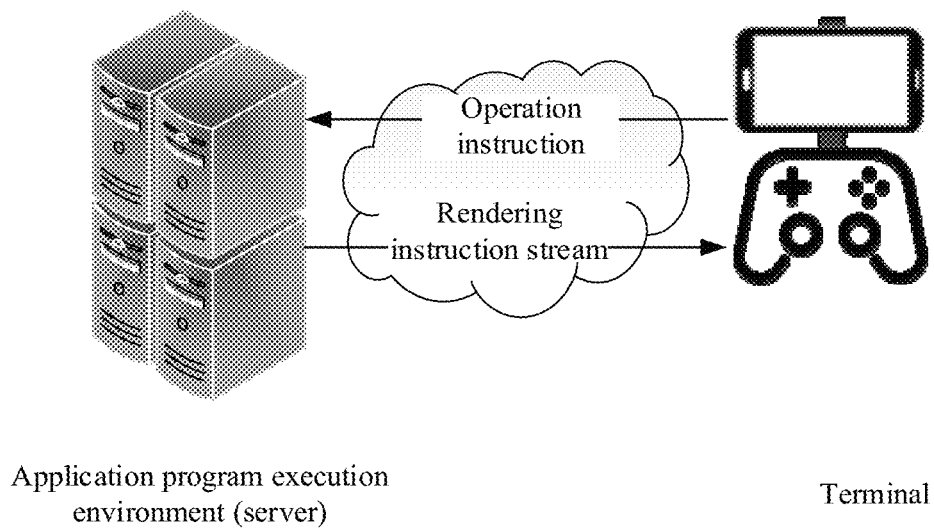
FIG. 3a is a schematic diagram of a system architecture of a cloud game scenario in the conventional technology according to an embodiment of this application.

FIG. 3a is a schematic diagram of a system architecture of a cloud game scenario, including a server and a terminal. The server includes at least one application program app (application). The terminal may be a mobile phone (or referred to as a "cellular" phone), a computer having a mobile property, or the like. The terminal may alternatively be a portable, pocket-sized, handheld, computer built-in, or in-vehicle mobile apparatus. In the cloud game scenario, a game client is installed on the terminal, and a user may start a game by using the game client on the terminal. The following is a process of an existing instruction cloud game:

A user starts a game by using an app client on a terminal, and enters operation instructions by using a touch, a mouse, a keyboard, a handle, or the like;
  the operation instructions are sent to a server through a network;
  the server receives the operation instructions and generates a rendering instruction stream, for example, an OpenGL or WebGL rendering instruction stream;
  the rendering instruction stream is sent to the terminal through the network; and
  the terminal parses and executes the rendering instruction stream by using a graphics processing unit (GPU) to perform image rendering and display.

Figure 3B:
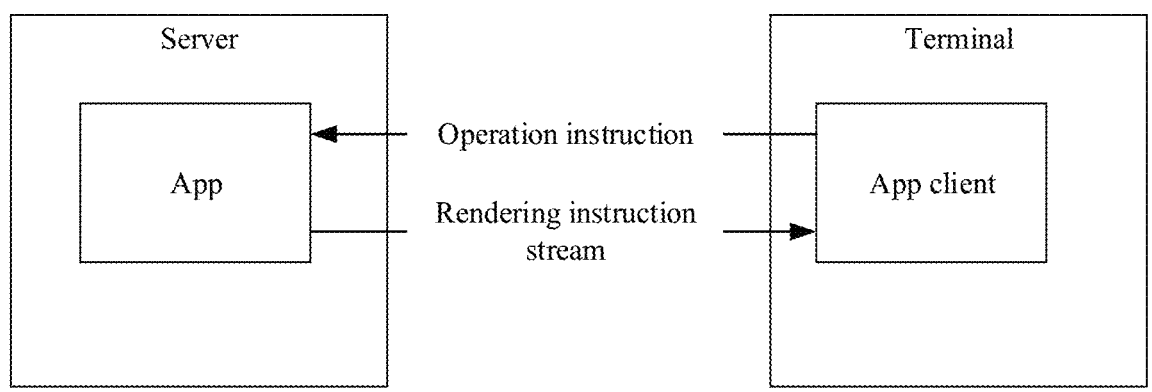
FIG. 3b is a schematic diagram of a system architecture of a cloud game scenario in the conventional technology according to an embodiment of this application.

As shown in FIG. 3b, when applied to a specific game application, the app client is a game client of a game installed on the terminal, and the app is a game service end. The game installed on the terminal includes a light load game, a medium load game, and a heavy load game. Classification of light load, medium load, and heavy load is performed based on a computing resource consumed by the terminal and the server during game running.

It should be understood that the classification of the light-load game, the medium-load game, and the heavy-load game is performed based on the computing resource consumed by the terminal during game running, which is a relative concept. For example, if a resource that is of the terminal and that may be consumed during game running is used as a criterion, a game that needs to consume 30% of the computing resource during game running may be referred to as a light-load game, for example, Angry Birds. A game that needs to consume 80% of the computing resource during game running is referred to as a heavy-load game, for example, Honor of Kings. A game that needs to consume 50% of the computing resource during game running is referred to as a medium-load game, for example, Fruit Ninja.

However, in an existing process described above, upon recovery from a network jitter, the app sends rendering instruction streams accumulated during the network jitter to the app client at the same time, and the data volume of rendering instruction streams increases linearly with jitter duration. As a result, transmission and processing delays of the rendering instruction streams are high, and the user experiences a high delay.

Figure 4:
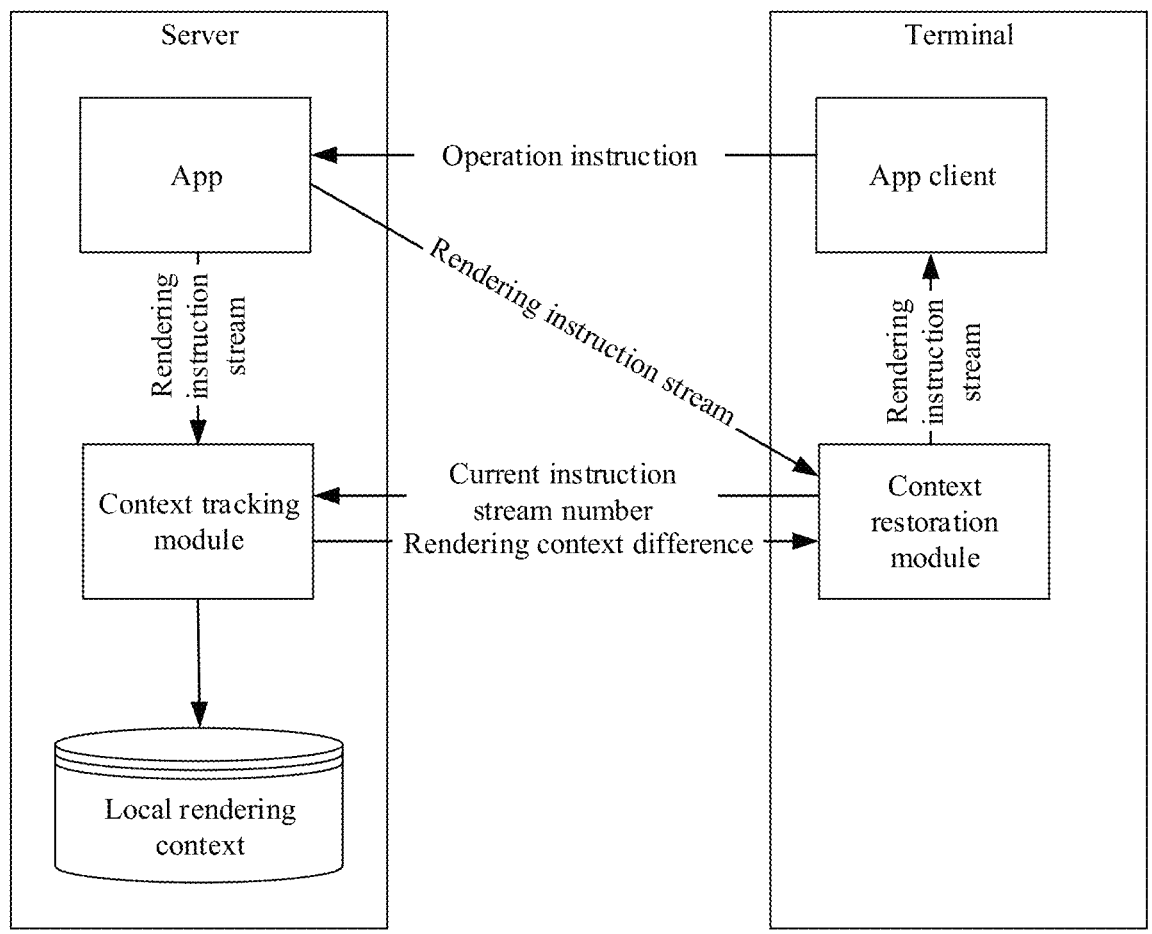
FIG. 4 is a schematic diagram of a system architecture of a cloud game scenario in the conventional technology according to an embodiment of this application.

An embodiment of this application provides a rendering method, and optimization is performed on a basis of the system architecture shown in FIG. 3b. FIG. 4 is a schematic diagram of a system architecture of a cloud game scenario according to an embodiment of this application. A context tracking module and a context restoration module are added to some embodiments of this application. An app, the context tracking module, and a local rendering context may be located on a server; and the context restoration module and an app client may be located on a terminal. The context restoration module may be alternatively located on the server. Main functions of the context tracking module, the context restoration module, the app, and the app client are described in the following.

Context Tracking Module:
  (a) tracking each rendering instruction stream and updating a local rendering context;
  (b) receiving a current instruction stream number sent by the context restoration module and using a local rendering context of the instruction stream number as a baseline snapshot, based on which a context difference is calculated for each restoration point later; and
  (c) sending a rendering context difference to the context restoration module after recovery from a network jitter.

Context Restoration Module:
  (a) receiving a rendering instruction stream sent by the app and processing the rendering instruction stream, for example, extracting a rendering instruction stream number and forwarding the rendering instruction stream number to the app client;
  (b) sending the instruction stream number of the currently received rendering instruction stream to the context tracking module;
  (c) receiving a rendering context difference sent by the context tracking module; and if the received rendering context difference is in a user-defined message format, converting the rendering context difference into a rendering instruction stream and sending the rendering instruction stream to the app client, or if the received rendering context difference is in a rendering instruction stream format, directly sending the rendering context difference to the app client; and
  (d) optionally, sending the instruction stream number of the rendering instruction stream last executed before a network jitter occurs to the context tracking module after recovery from the network jitter.

The functions of the app and the app client are updated on a basis of the original functions in the following.

App:
  (a) sending a rendering instruction stream to the context tracking module.

App Client:
  (a) receiving a rendering instruction stream sent by the context restoration module.

It should be noted that in the cloud game scenario, messages are transmitted between the terminal and the server in a form of a "message stream". The message stream herein is a set carrying a plurality of messages, for example, the foregoing rendering instruction stream and operation instructions.

It should be understood that division of the app and the context tracking module is logical division in the architecture shown in FIG. 4. Alternatively, the app and the context tracking module may be deployed together, and the app client and the context restoration module may be deployed together. In the following embodiments of this application, an example in which the app and the context tracking module are separately deployed, and the app client and the context restoration module are separately deployed is used for description.

For ease of understanding, before a detailed process is described, an OpenGL ES is used as an example to illustrate a data structure of a rendering context, a type of a rendering instruction stream, and methods for generating, transferring, and restoring a rendering context difference.

Figure 5:
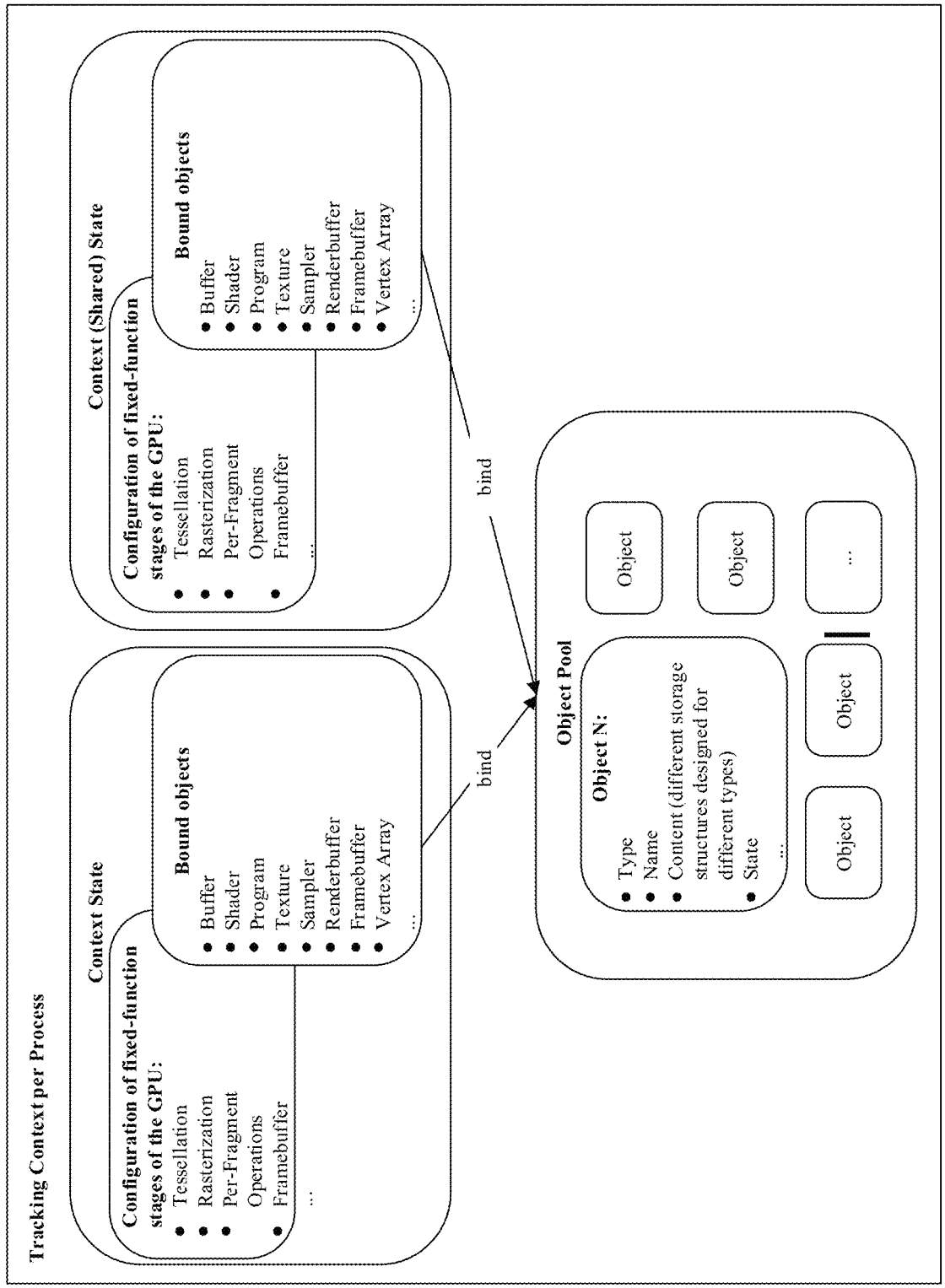
FIG. 5 is a schematic diagram of a data structure of a rendering context according to an embodiment of this application.

FIG. 5 is a schematic diagram of a data structure of a rendering context.

A rendering context is a data structure that stores rendering information. It stores various states, including vertex information, texture information, compiled shader information, and the like, based on which rendering is completed. Specifically, the rendering context includes the following.
(1) One Context State (Context State) and 0 to a Plurality of Context Shared States (Context Shared States)

The context state includes:
configuration of fixed-function stages of the GPU (fixed-function stages of the GPU): Only a specific rendering configuration item is changed, for example, whether to enable the rendering configuration item; and
bindings of objects to the context: This type of instruction binds a specific object to or unbinds a specific object from a context.
(2) One Object Pool The object pool includes various types of objects, such as caches and shader programs. Content and a state of each object are tracked. An object pool instruction specifies creation or deletion of an object.

Object content instruction: changes content of an object. Different types of objects have content in different forms. Therefore, different data structures need to be designed for different types of objects. For example, content of a buffer type is a buffer, and any change to the buffer needs to be tracked. However, tracking some types of objects may be unavailable or tracking costs are comparatively high. In this case, tracking may be lessened. In other words, only a difference is tracked, and content of the difference is not tracked but marked as: content not trackable, and the timestamp of the last change is marked. When difference comparison is performed, if timestamps are the same, it is considered that there is no difference, that is, comparison can be performed; or if timestamps are different, it is considered that comparison cannot be performed, this feature cannot be used, and an original process is used for restoration.

With reference to the schematic diagram of a data structure of a rendering context shown in FIG. 5, rendering instruction streams may be divided into four types. Five typical objects are used as examples in the following. For details, see Table 1.

TABLE 1

Classification of rendering instruction streams

| Type of change tracking | Example API | Buffer | Shader/Program | Texture | Vertex array |
|---|---|---|---|---|---|
| Configuration of fixed-function stages of the GPU | glEnable glDisable | / | / | / | / |
| Bindings of objects | glBindXXX | glBindbuffer | glUseProgram | glBindTexture | glBindVertexArray |
| Object pool | glGenXXX/ DeleteXXX | glGenbuffers glDeletebuffers | glCreateShader glDeleteShader glCreateProgram | glGenTextures | |
| Object content | Any API that may change object content | glBufferData glBufferSubData | glShaderSource glAttachShader glLinkProgram | glTexImage2D | glVertexAttribPointer |

Specifically, four instruction examples are provided in the following.
(1) glEnable(SCISSOR_TEST): enables a scissor test for a current context.
(2) glBindBuffers (GLsizei n,GLuint*buffers): binds n buffer objects to a current context.
(3) glGenBuffers(sizei n, uint*buffers): creates n buffer objects in a pool.
(4) glBufferData(GLenum target,GLsizeiptr size,const GLvoid*data,GLenum usage): initializes a buffer object "target" and copies "size" bytes of content directed by "data" to "target".

The methods for generating, transferring, and restoring a rendering context difference is described in the following with reference to the foregoing description of a rendering instruction stream and a rendering context.

For calculation of a rendering context difference, comparison may be performed based on the four types of rendering instruction streams described above. Examples are provided in the following.

Configuration of fixed-function stages of the GPU: compares whether a specific configuration is changed.
For example, a configuration in a context CtxA is set to "Enable", and the configuration in a context CtxB is set to "Disable". In this case, a difference between CtxA and CtxB is CtxB−CtxA, that is, the configuration is set to "Disable".
For example, a configuration in a context CtxA is set to "Disable", and the configuration in a context CtxB is set to "Disable". In this case, a difference between CtxA and CtxB indicates that there is no difference.

Bindings of objects: compares whether a specific object is bound to a context.

For example, an object is bound to a context CtxA, and the object is not included in a context CtxB. In this case, a difference between CtxA and CtxB is CtxB−CtxA, that is, the object is not bound.

For example, an object is bound to a context CtxA, and the object is also bound to a context CtxB. In this case, a difference between CtxA and CtxB indicates that there is no difference.

Object pool instruction: compares whether a specific object is in a pool.

Object content: compares content of an object.

For example, if a buffer object is used for describing a group of vertex information (position, texture, and color), only data in the buffer object in two snapshots needs to be compared to obtain a difference.

As described above, some types of objects may be marked as: content not comparable (not trackable). Therefore, only timestamps are compared. If the timestamps are the same, it indicates that there is no difference. If the timestamps are different, it indicates that a context difference cannot be generated, and comparison stops.

As described above, there may be three results for a context difference: no difference, different, and not comparable.

For a rendering context difference indicating comparable, a server needs to transfer the rendering context difference to a terminal. A transferred message may be a context difference itself, a rendering instruction stream obtained through conversion, or both, as shown in Table 2.

TABLE 2

Transfer of a rendering context difference

| Difference type | Difference transferred | Command transferred |
|---|---|---|
| Difference in configuration of fixed-function stages of the GPU | (Configuration item + enable or disable) list | glEnable/glDisable(configuration item) |
| Difference in bindings of objects | Bind(ctx, object list), Unbind(ctx, object list) | glBindXXX(id)/glBindXXX(0) |
| Difference in object pool | List of new objects, list of deleted objects | glGenXXX/glDeleteXXX |
| Difference in object content | (Difference object, difference position, difference content) list | glBufferData(difference) glBufferSubData(difference) |

For example, when object content difference of a specific buffer object is transferred, changed memory information of the object may be transferred, or the object content difference is converted into an instruction glBufferSubData for transfer.

After the context restoration module receives a rendering context difference, if the rendering context difference is an instruction stream, the context restoration module directly forwards the rendering context difference to the app client; or if the rendering context difference is a difference in a user-defined format, the context restoration module converts the rendering context difference into a rendering instruction stream, and then forwards the rendering instruction stream to the app client for parsing and execution.

Figure 6:
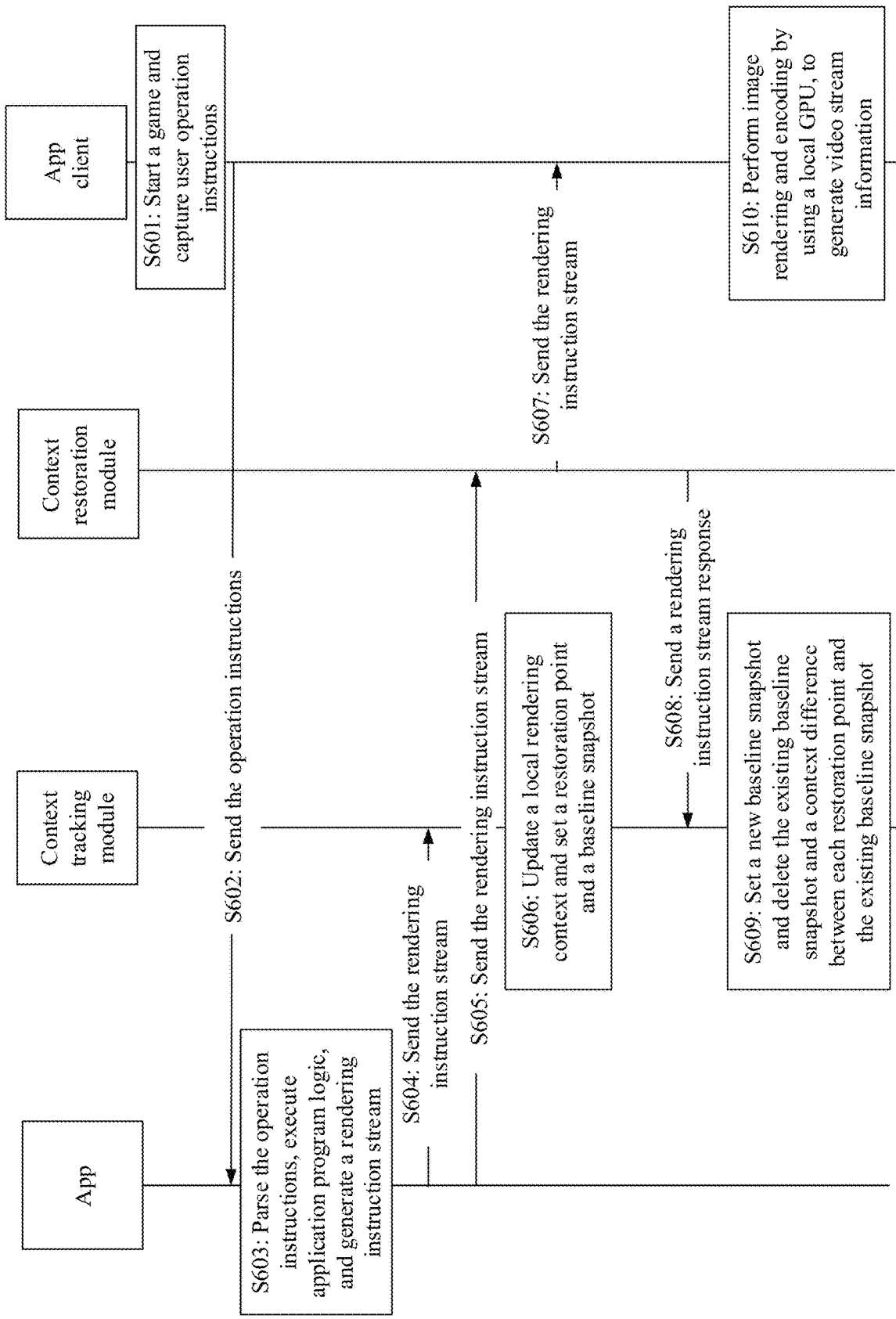
FIG. 6 is a schematic flowchart of a method for overcoming a rendering delay according to an embodiment of this application.

FIG. 6 is a schematic diagram of a basic process in the system architecture shown in FIG. 4 when no network jitter occurs according to an embodiment of this application. The method provided in this embodiment of this application is described from a perspective of interaction between the client and the server. The basic process includes the following steps.

S601: Start a game and capture user operation instructions.

Specifically, a user starts the game by using a game client, that is, the app client, installed on the terminal. In this case, the app client generates operation instructions. The operation instructions include operation information, such as tapping or dragging by 1 cm to the left, that is entered by the user by using a terminal input device, such as a screen touch, a mouse, a keyboard, or a handle.

S602: The terminal sends the operation instructions to the app.

Data is transmitted between the terminal and the app through TCP/IP. According to a TCP/IP protocol, the terminal and the app first establish a TCP/IP connection through a three-way handshake.

S603: The app parses the operation instructions, starts the game, executes application program logic, and generates a rendering instruction stream.

S604: The app sends the rendering instruction stream to the context tracking module.

S605: The app sends the rendering instruction stream to the context restoration module.

S606: After receiving the rendering instruction stream, the context tracking module updates a local rendering context and sets a restoration point and a baseline snapshot.

Figure 7A:
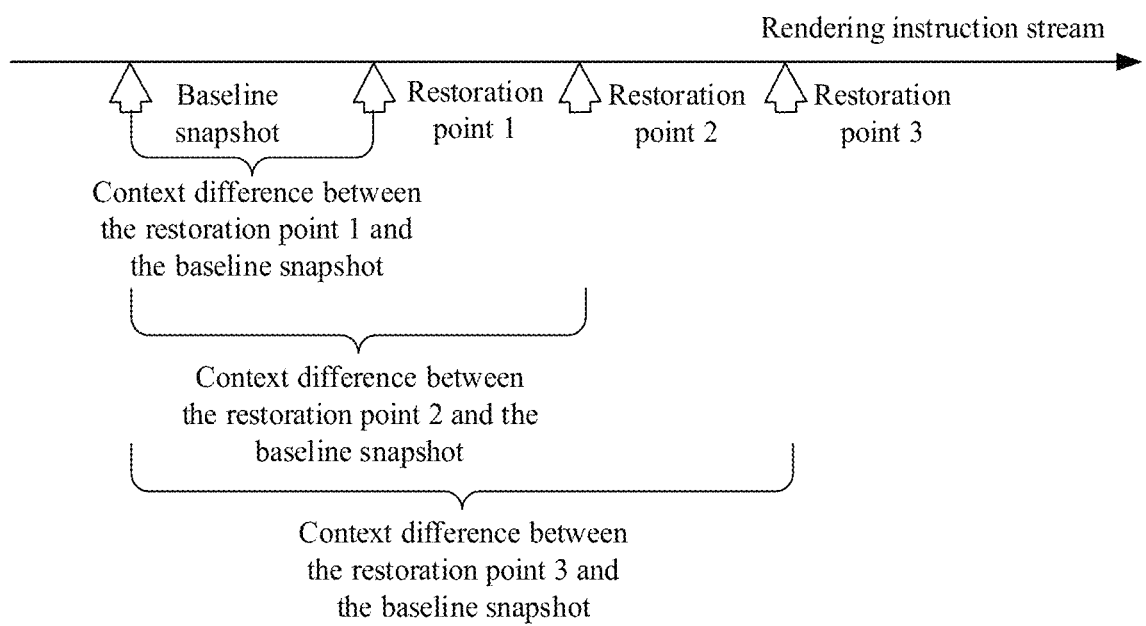
FIG. 7a is a schematic diagram of relationships between a baseline snapshot and restoration points according to an embodiment of this application.

Specifically, after the context tracking module receives the rendering instruction stream:

if a local rendering context baseline snapshot is not generated, the context tracking module stores a local rendering context corresponding to a current instruction stream number, and sets the local rendering context as the baseline snapshot; or if there is a baseline snapshot, local rendering contexts in some rendering instruction streams may be stored as restoration points based on rules, or only rendering context differences between restoration points and the baseline snapshot are stored. As shown in FIG. 7a:

The rules include:

after the context tracking module receives one or more rendering instruction streams from the app;

after the context tracking module receives a one-frame rendering instruction stream from the app;

after the context tracking module receives a specific rendering instruction stream, where a feature instruction is set by the context tracking module, for example, a draw instruction or a swap instruction; or the context tracking module periodically performs setting, where a period is set by the context tracking module.

S607: The context restoration module sends the rendering instruction stream to the app client.

S608: The context restoration module sends an instruction stream response message to the context tracking module.

Steps S607 and S608 occur after the context restoration module receives the rendering instruction stream from the app.

After receiving the rendering instruction stream from the app, the context restoration module sends the rendering instruction stream to the app client. Specifically, after receiving the rendering instruction stream from the app, the context restoration module may first cache a rendering instruction between two restoration points without sending it, and then send rendering instructions to the app client at a time when a next restoration point arrives, thereby ensuring integrity upon recovery from a network jitter.

Specifically, when the context restoration module sends the instruction stream response message to the context tracking module, the instruction stream response message includes the rendering instruction stream number last received by the context restoration module. An occasion at which the context restoration module sends an instruction stream response message includes:

after the context restoration module receives each rendering instruction stream;

after the context restoration module receives a plurality of rendering instruction streams;

after the context restoration module receives a specific instruction, where the specific instruction is set by the context restoration module, for example, a draw instruction or a swap instruction;

after the context restoration module receives a rendering instruction stream corresponding to data of one frame; or the context restoration module periodically sends an instruction stream response message, where a period is set by the context restoration module.

S609: After receiving the instruction stream response message from the context restoration module, the context tracking module sets a new baseline snapshot and deletes the existing baseline snapshot and a context difference between each restoration point and the existing baseline snapshot.

Figure 7B:
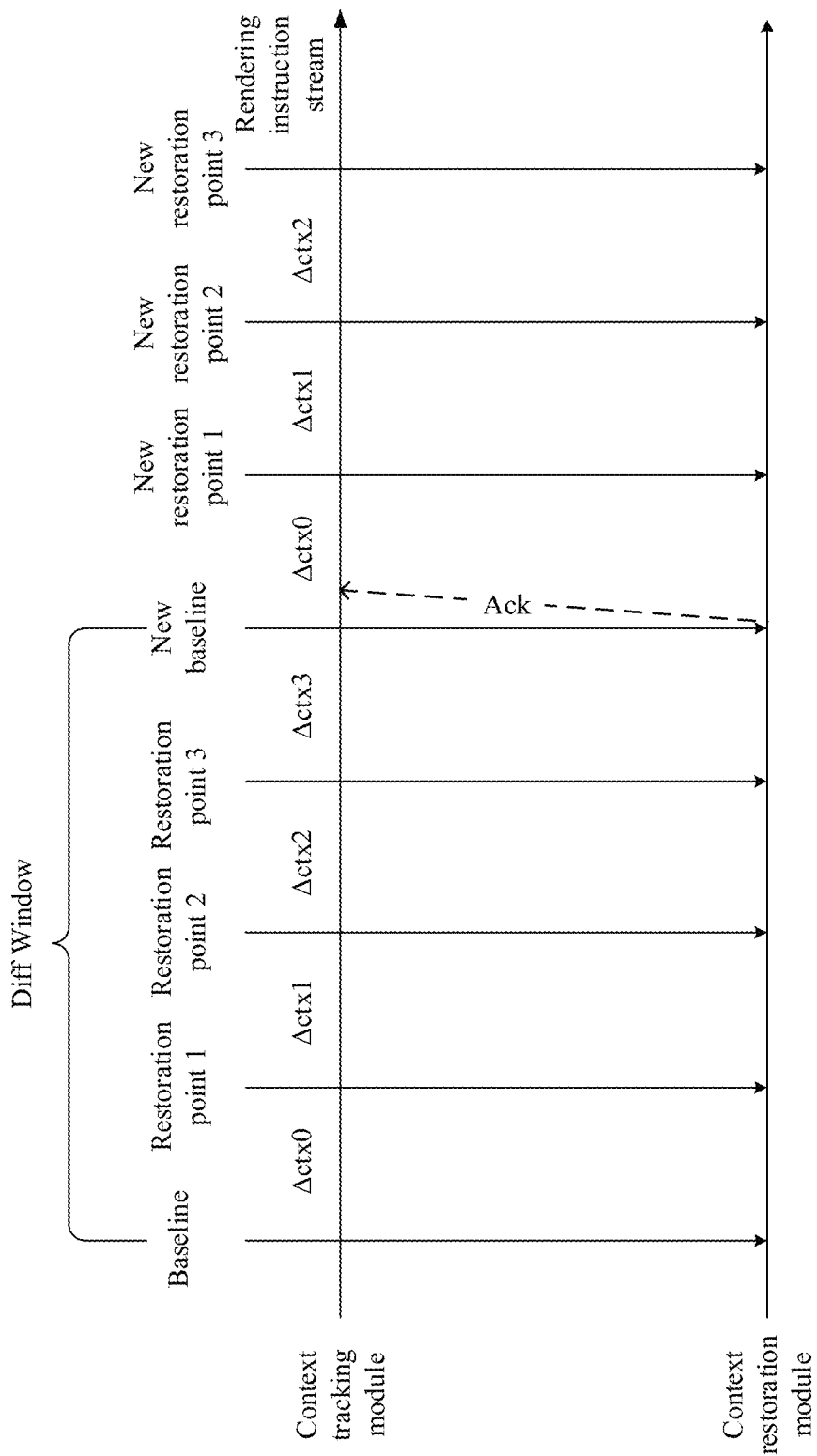
FIG. 7b is a schematic diagram of resetting a baseline snapshot and restoration points according to an embodiment of this application.

Specifically, if the context tracking module stores the context difference between each restoration point and the existing baseline snapshot, the context tracking module recalculates a context difference between each restoration point and the new baseline snapshot, as shown in FIG. 7b.

S610: After receiving the rendering instruction stream, the app client performs image rendering and display by using a local GPU.

Figure 8:
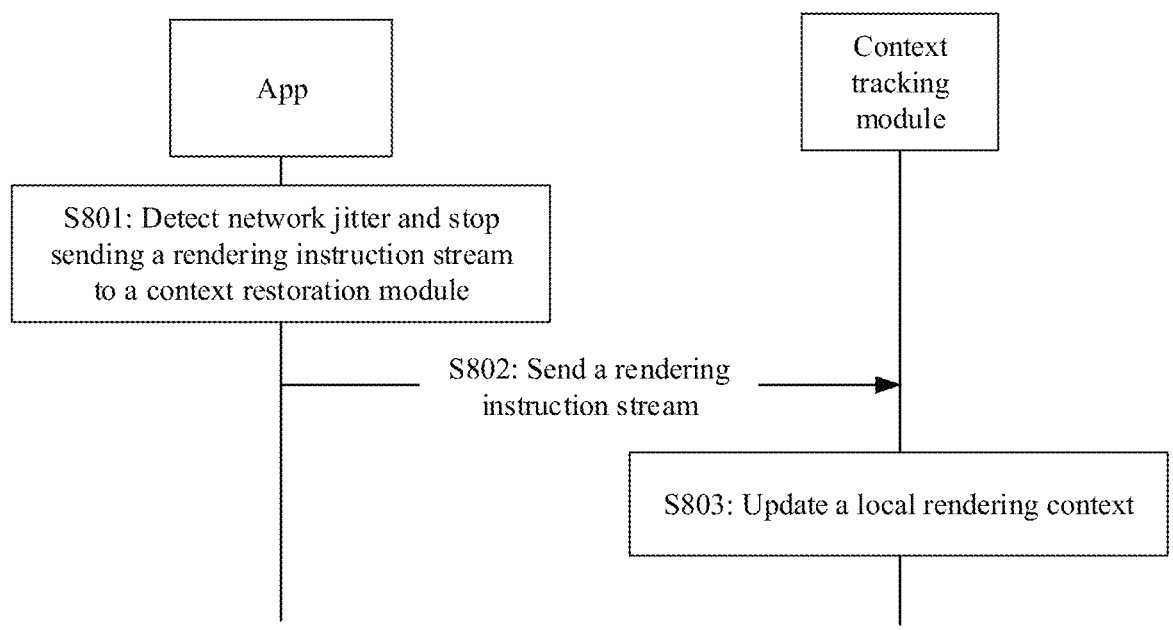
FIG. 8 is a schematic flowchart in the case of a network jitter according to an embodiment of this application.

FIG. 8 is a schematic diagram of a process in the case of a network jitter according to an embodiment of this application. The process includes the following steps.

S801: The app detects a network jitter and stops sending a rendering instruction stream to the context restoration module.

S802: The app sends a rendering instruction stream to the context tracking module.

S803: After receiving the rendering instruction stream, the context tracking module sets a restoration point based on rules and updates a local rendering context.

Specifically, the rules for setting a restoration point are consistent with the rules described in step S606.

It should be noted that when the context tracking module detects the network jitter, the server side does not generate a new restoration point anymore, but continues to update the local rendering context.

The foregoing is the basic process and the process that is used when a network jitter occurs according to embodiments of this application. On this basis, a method for restoring a rendering context by using a rendering context difference upon recovery from the network jitter is described in detail in the following by using specific embodiments. Embodiments are distinguished by using different manners of calculating and transferring a rendering context difference.

Embodiment 1: The context restoration module determines whether instruction stream numbers of all restoration points in the context tracking module include the instruction stream number last executed by the context restoration module. If the instruction stream number is included, the context restoration module converts a rendering context difference into a rendering instruction stream and sends the rendering instruction stream to the app client. In this implementation, after receiving a rendering instruction stream, the terminal first caches a rendering instruction stream between two restoration points without parsing and execution, and then performs one-time parsing and execution when a next restoration point arrives, thereby ensuring integrity upon recovery from the network jitter. Therefore, the instruction stream number last executed by the context restoration module is the same as an instruction stream number that is of the last restoration point and that is recorded by the context restoration module.

Figure 9:
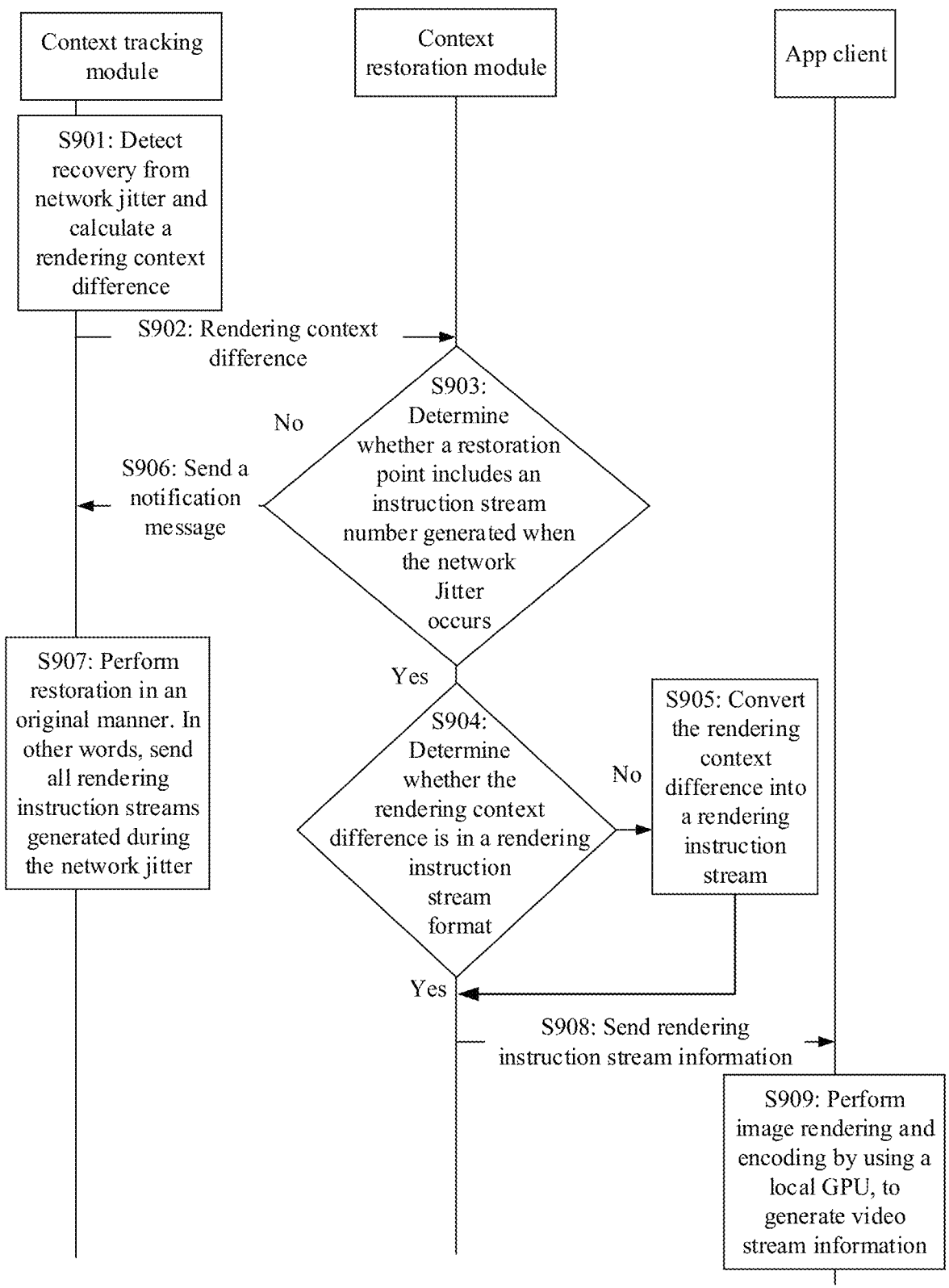
FIG. 9 is a specific process of restoring a rendering context by using a rendering context difference upon recovery from a network jitter according to an embodiment of this application.

FIG. 9 is a specific process of restoring a rendering context by using a rendering context difference upon recovery from a network jitter according to an embodiment of this application, including the following steps.

S901: The context tracking module detects recovery from the network jitter and calculates a rendering context difference.

Figure 10A:
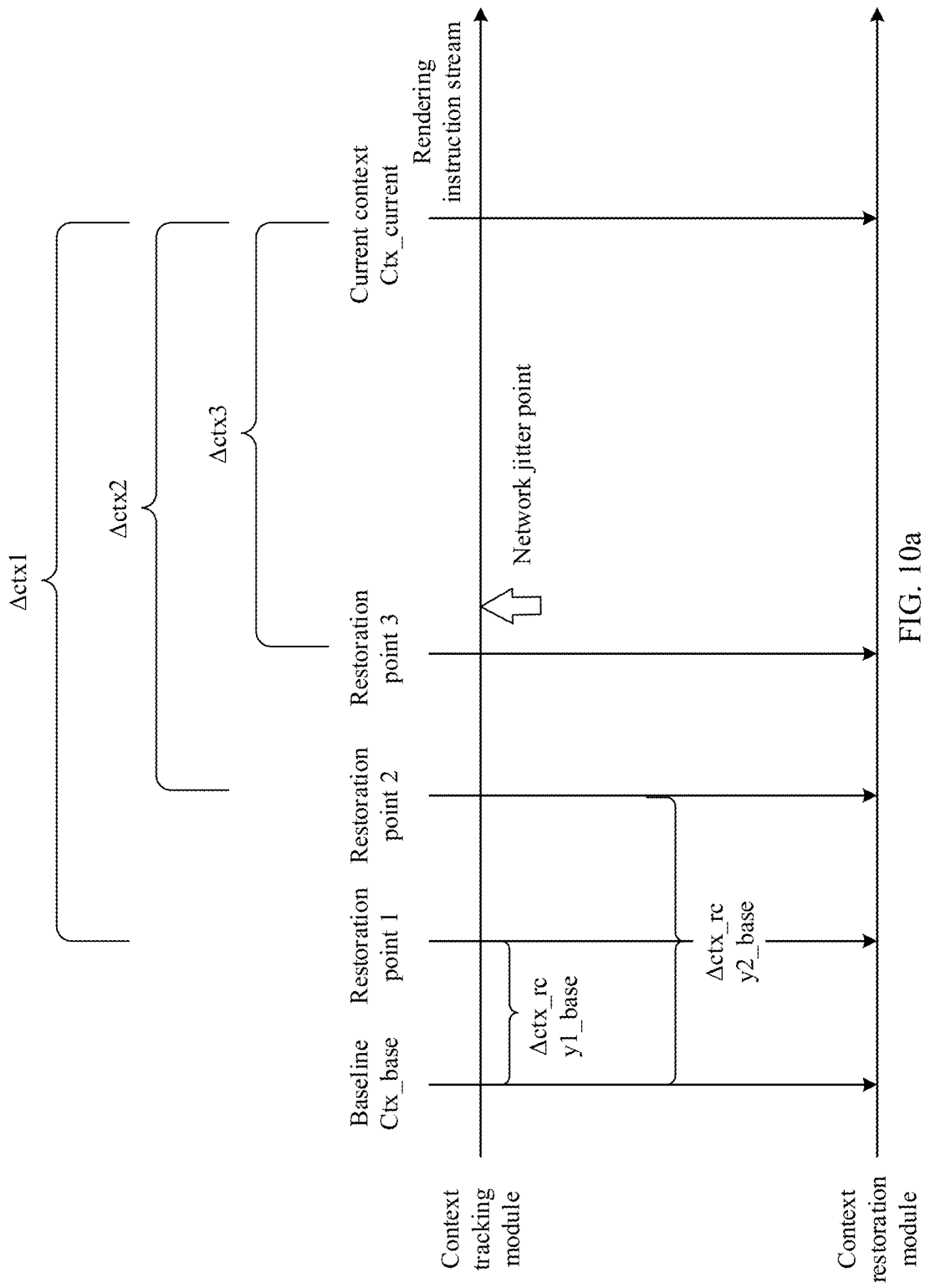
FIG. 10a is a schematic diagram of a rendering context difference calculation manner according to an embodiment of this application.

Specifically, the context tracking module sends rendering context differences between a current rendering context and all restoration points to the context restoration module upon recovery from the network jitter. As shown in FIG. 10a, because a baseline snapshot Ctx_base, a context difference $\Delta ctx\_rcyN\_base$ between each restoration point and the baseline snapshot, and a latest rendering context Ctx_current are stored, the rendering context difference between the current rendering context and each restoration point may be calculated based on the following formula, where N is a sequence number of a restoration point:

$$\Delta ctxN = Ctx\_current - Ctx\_base - \Delta ctx\_rcyN\_base$$

It should be noted that for a type of object that cannot be tracked or whose tracking costs are comparatively high, tracking may be lessened. Only a difference is tracked, and content of the difference is not tracked. In other words, the object type is marked as content not trackable, and the timestamp of the last change is marked. When difference comparison is performed, if timestamps are the same, it is considered that there is no difference; or if timestamps are different, it is considered that comparison cannot be performed, this feature cannot be used, and an original process is used for restoration.

S902: The context tracking module sends the rendering context difference to the context restoration module.

Specifically, the rendering context difference may be transferred by using a user-defined message structure, and the context restoration module converts the rendering context difference into a rendering instruction stream after receiving the rendering context difference. Alternatively, the context tracking module may first convert the rendering context difference into a rendering instruction stream and then send the rendering instruction stream to the context restoration module.

S903: The context restoration module determines whether a restoration point includes an instruction stream number generated when the network jitter occurs.

If the instruction stream number generated when the network jitter occurs is included, proceed to step S904.

If the instruction stream number generated when the network jitter occurs is not included, proceed to step S906.

Figure 10B:
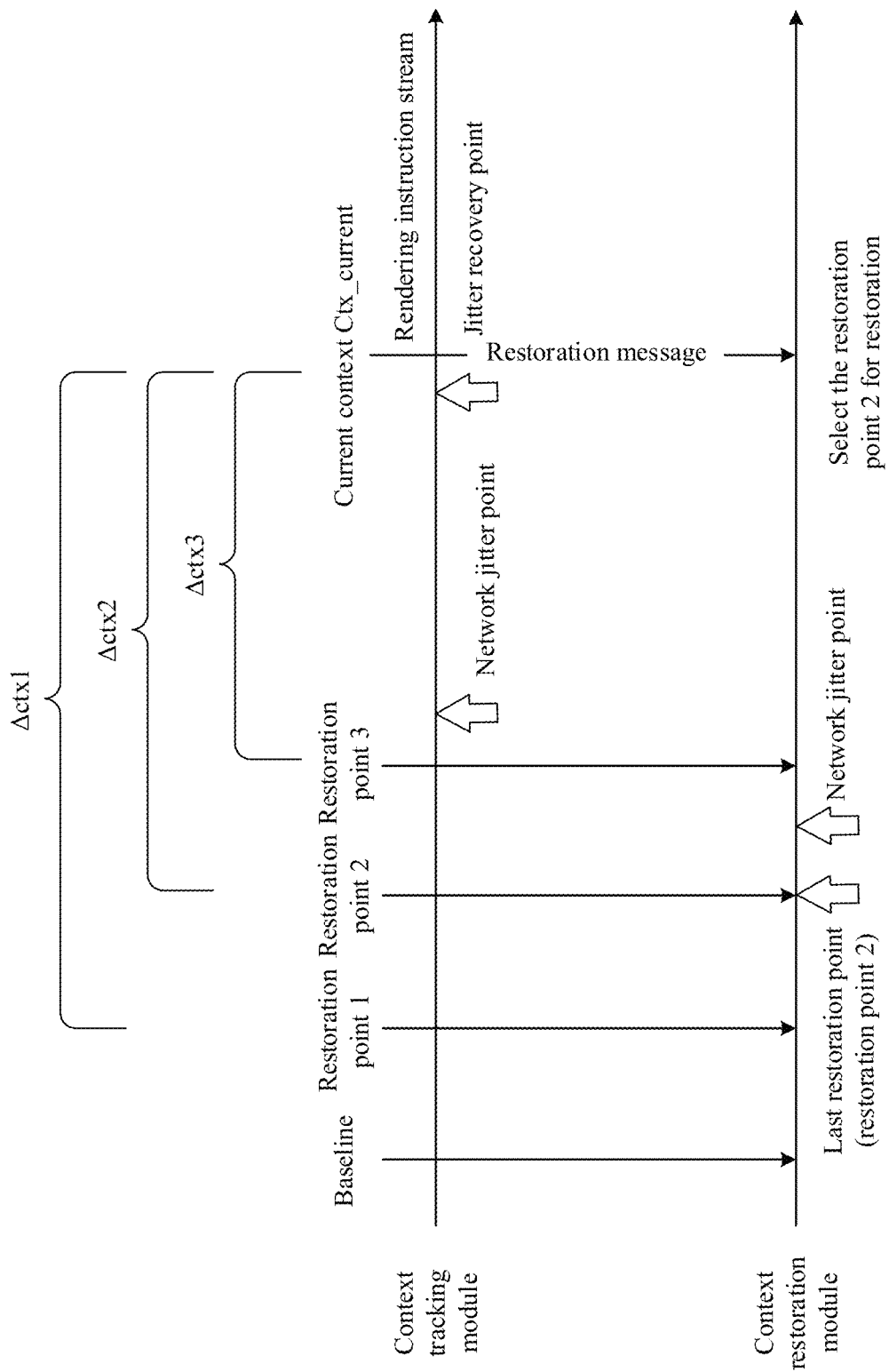
FIG. 10b is a schematic diagram of another rendering context difference calculation manner according to an embodiment of this application.

Specifically, the context restoration module compares, based on rendering instruction stream execution performed by the context restoration module, the last executed rendering instruction stream number with a restoration point that is set by the context tracking module. If a restoration point whose rendering instruction stream number is the same as the last executed rendering instruction stream number can be found, a rendering context difference corresponding to the restoration point is selected for restoration, as shown in FIG. 10b.

S904: Determine whether the received rendering context difference is in a rendering instruction stream format.

If the received rendering context difference is in the rendering instruction stream format, proceed to step S908.

If the received rendering context difference is not in the rendering instruction stream format, proceed to step S905.

S905: Convert the received rendering context difference into a rendering instruction stream. Then proceed to step S908.

S906: Send a notification message to the context tracking module, indicating that the restoration point does not include the instruction stream number generated when the network jitter occurs. Then proceed to step S907.

S907: Perform restoration in an original manner. In other words, send all rendering instruction streams generated during the network jitter.

S908: Send the rendering instruction stream to the app client. Proceed to step S909.

S909: Perform image rendering and encoding by using a local GPU, to generate video stream information.

In the implementation of Embodiment 1 of this application, after recovery from the network jitter, the context tracking module needs to send only rendering context differences generated before and after the network jitter. In most cases, the quantity of rendering instruction streams corresponding to the rendering context differences is greatly reduced compared with the quantity of rendering instruction streams accumulated during the network jitter. Therefore, network traffic can be reduced and client recovery can be dramatically accelerated, thereby improving user experience.

Embodiment 2: Upon recovery from the network jitter, the context tracking module waits for the context restoration module to report, after the recovery from the network jitter, the instruction stream number last received by the context restoration module before the network jitter occurs; or the context tracking module proactively initiates a message to the context restoration module to query the instruction stream number last received by the context restoration module before the network jitter occurs. After obtaining the specific last instruction stream number, the context tracking module calculates a rendering context difference based on the last instruction stream number and sends the rendering context difference to the context restoration module.

Figure 11:
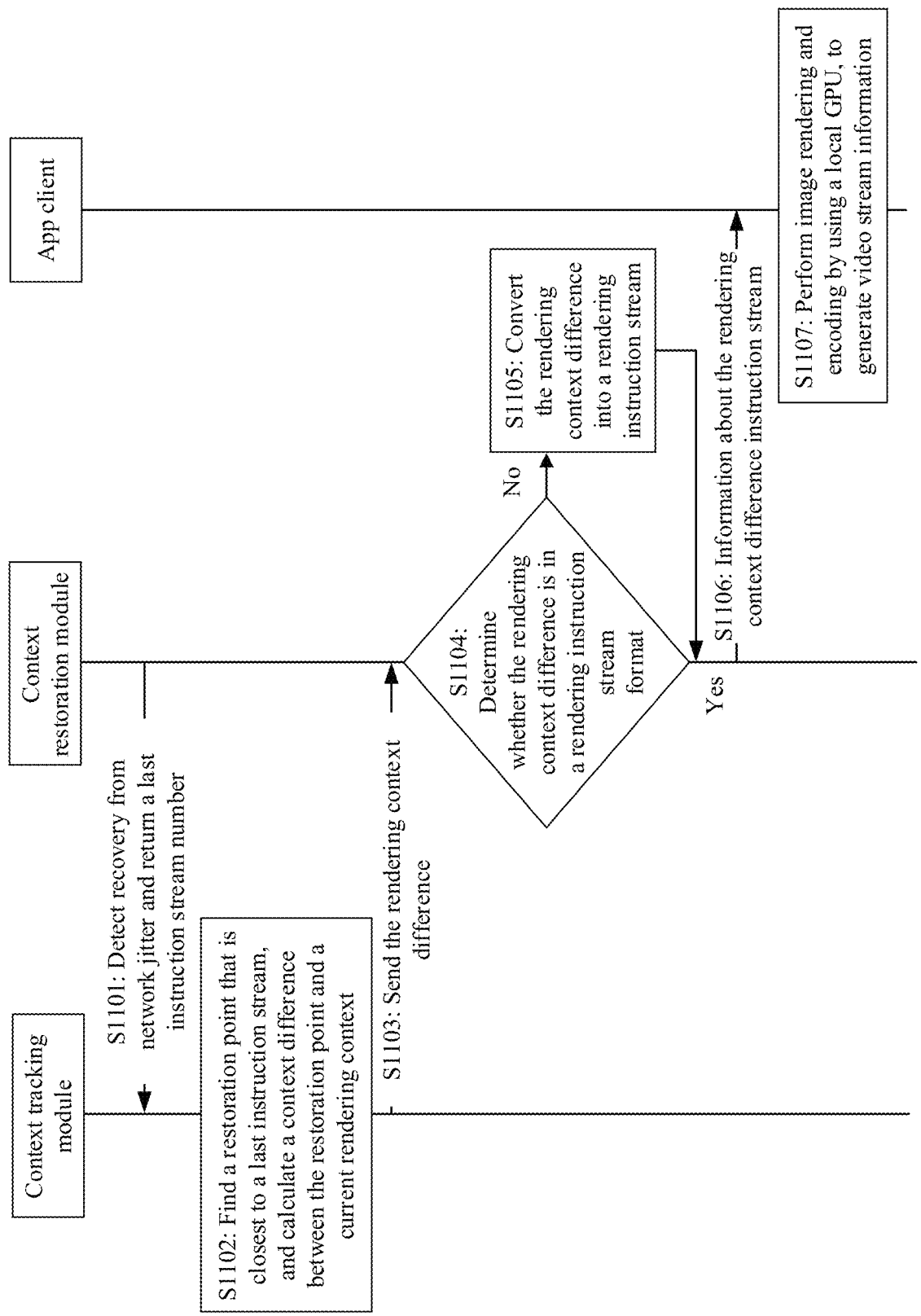
FIG. 11 is a schematic flowchart of proactively reporting the last executed rendering instruction stream number to perform jitter recovery according to an embodiment of this application.

It may be understood that, the context restoration module may send, when detecting the recovery from the network jitter, the instruction stream number last received by the context restoration module before the network jitter occurs, or may report the instruction stream number last received by the context restoration module before the network jitter occurs, when a connection between the context tracking module and the context restoration module is restored. As shown in FIG. 11, the following steps are included.

S1101: The context restoration module detects the recovery from the network jitter, and returns the last instruction stream number to the context tracking module.

S1102: The context tracking module finds a restoration point that is the closest to the last instruction stream and calculates a context difference between the restoration point and a current rendering context.

S1103: The context tracking module sends the rendering context difference to the context restoration module.

S1104: The context restoration module determines whether the received rendering context difference is in a rendering instruction stream format.

If the received rendering context difference is in the rendering instruction stream format, proceed to step S1106.

If the received rendering context difference is not in the rendering instruction stream format, proceed to step S1105.

S1105: Convert the rendering context difference into a rendering instruction stream. Then proceed to step S1106.

S1106: The context restoration module sends the rendering context difference instruction stream to the app client.

S1107: Perform image rendering and encoding by using a local GPU, to generate video stream information.

Figure 12:
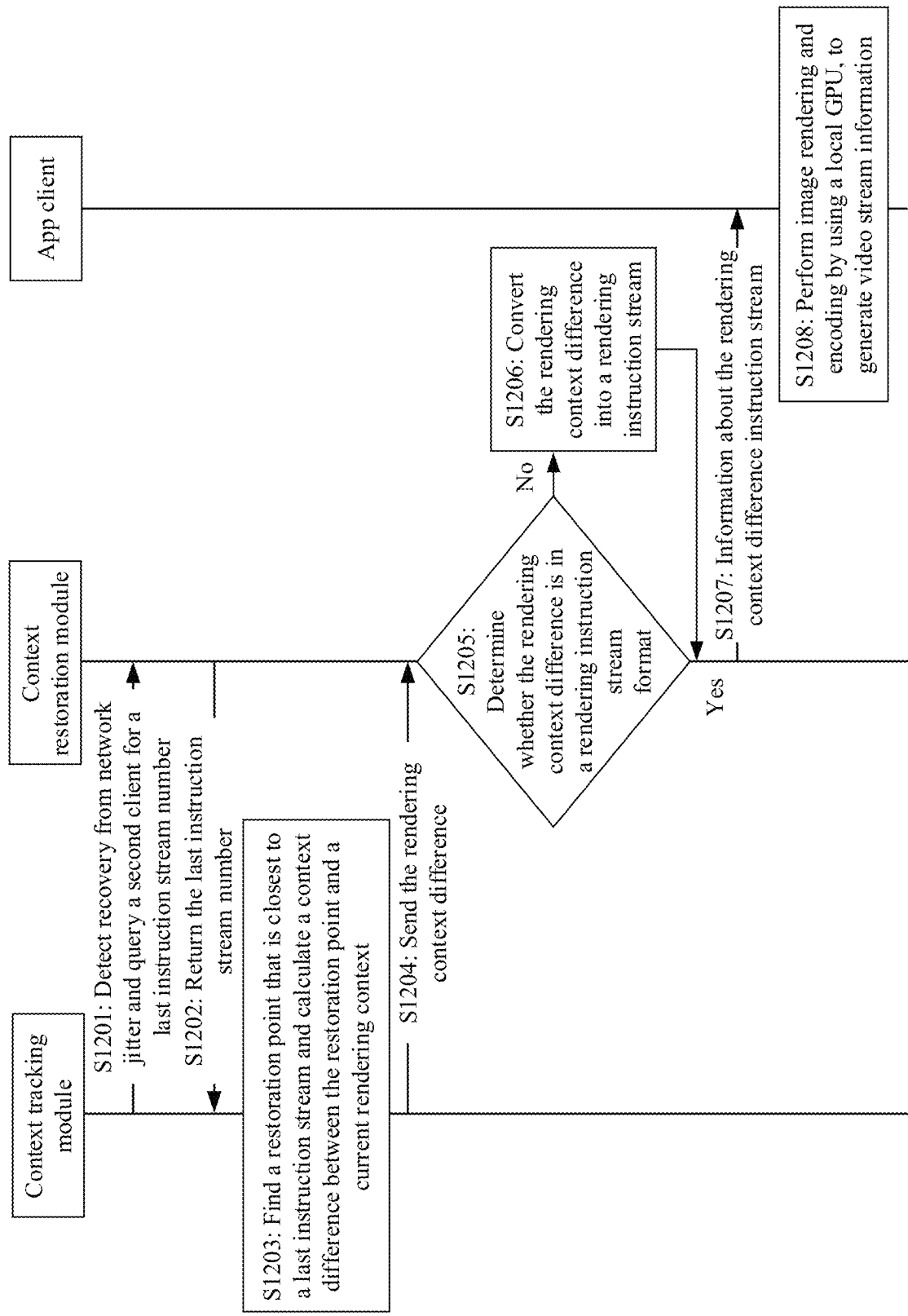
FIG. 12 is a schematic flowchart of querying the last executed rendering instruction stream number to perform jitter recovery according to an embodiment of this application.

It may be understood that the context tracking module may query, upon recovery from the network jitter, the context restoration module for the instruction stream number last received by the context restoration module before the network jitter occurs. As shown in FIG. 12, the following steps are included.

S1201: The context tracking module detects the network recovery and queries the context restoration module for the last instruction stream number.

S1202: The context restoration module returns the last instruction stream number to the context tracking module.

Steps S1203 to S1208 are the same as steps S1102 to S1107 respectively.

S1203: The context tracking module finds a restoration point that is the closest to the last instruction stream and calculates a context difference between the restoration point and a current rendering context.

S1204: The context tracking module sends the rendering context difference to the context restoration module.

S1205: The context restoration module determines whether the received rendering context difference is in a rendering instruction stream format.

If the received rendering context difference is in the rendering instruction stream format, proceed to step S1207.

If the received rendering context difference is not in the rendering instruction stream format, proceed to step S1206.

S1206: Convert the rendering context difference into a rendering instruction stream. Then proceed to step S1207.

S1207: The context restoration module sends the rendering context difference instruction stream to the app client.

S1208: Perform image rendering and encoding by using a local GPU, to generate video stream information.

In this implementation, the context tracking module does not need to send context differences of all restoration points to the context restoration module, but only needs to find the restoration point the closest to the last instruction stream number and send the context difference corresponding to the closest restoration point to the context restoration module.

Embodiment 2 differs from Embodiment 1 in that a context difference between a corresponding instruction stream number obtained upon network jitter and the closest restoration point can be identified, and only a rendering context difference between a network jitter point and a latest rendering context is sent.

Embodiment 3: The context restoration module queries the context tracking module for restoration point information, or restoration point information is recorded in the context restoration module based on a rule for setting a restoration point. The context restoration module receives rendering context differences of all restoration points sent by the context tracking module, determines the closest restoration point, obtains, based on a rendering instruction stream between a recorded network jitter point and the closest restoration point, a context difference between the network jitter point and the closest restoration point, and then calculates a difference between the network jitter point and a current rendering context.

Figure 13:
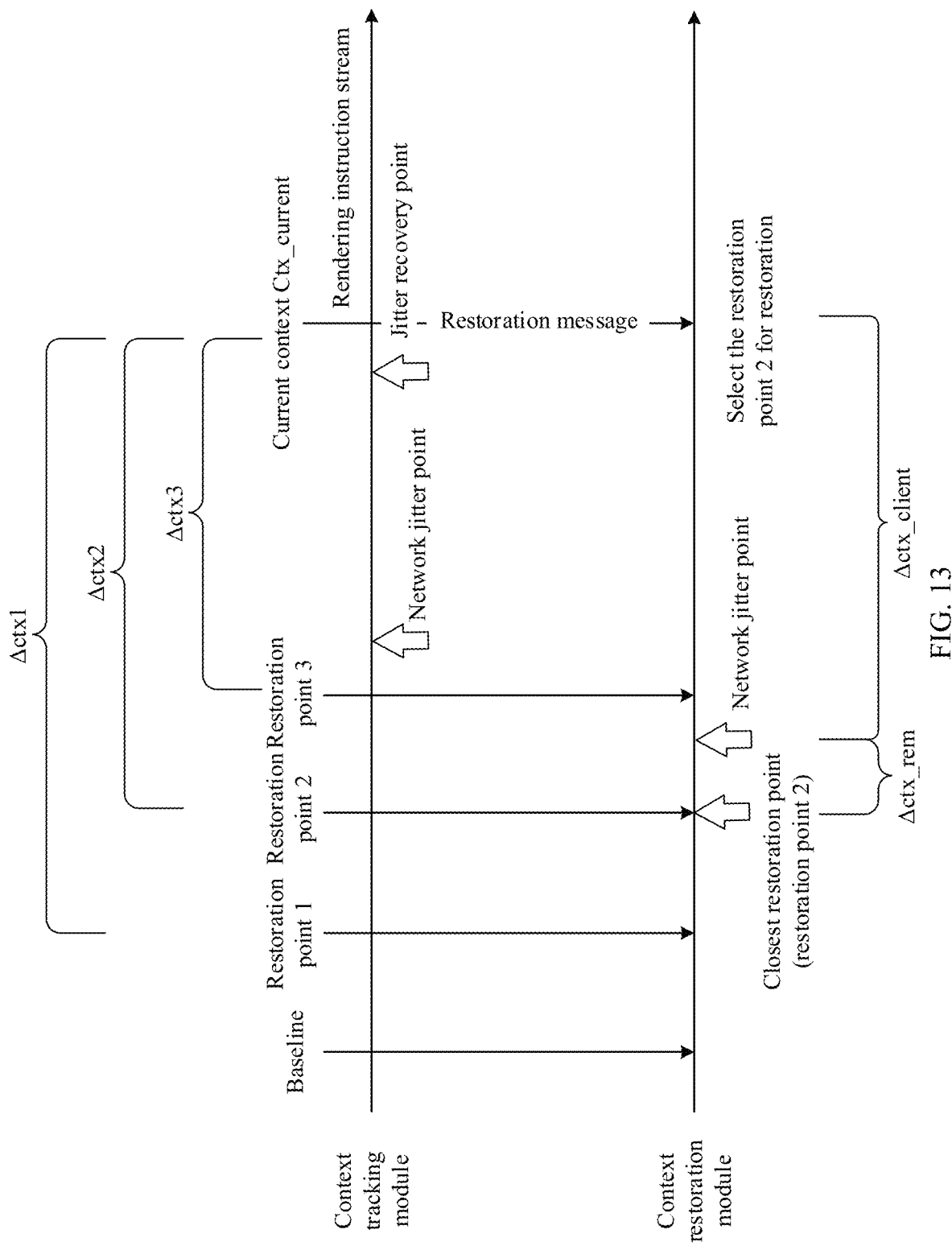
FIG. 13 is a schematic diagram of a context difference between a rendering context corresponding to a network jitter point and a latest rendering context according to an embodiment of this application.

As shown in FIG. 13, the context tracking module sends context differences between all the restoration points and the current rendering context, that is, $\Delta ctx1$, $\Delta ctx2$, and $\Delta ctx3$, to the context restoration module. It may be understood that the context tracking module and the context restoration module may detect the network jitter at different times. As a result, the context tracking module does not know which rendering instruction stream the context restoration module executes, and therefore sends context differences of a plurality of restoration points. The context restoration module determines that the closest restoration point is a restoration point 2, and therefore selects $\Delta ctx2$. In addition, the context restoration module obtains, based on a rendering instruction stream between a recorded network jitter point and the restoration point 2, a rendering context difference between the network jitter point and the restoration point 2: $\Delta ctx\_rem$. In this case, when a network jitter occurs, a context difference $\Delta ctx\_client$ between the current rendering context and a rendering context that has been executed by the context restoration module may be obtained based on the following formula:

$$\Delta ctx\_client = \Delta ctx2 - \Delta ctx\_rem$$

The process of Embodiment 3 is similar to the process of Embodiment 1, and a difference lies in processing of the context restoration module. In some embodiments of this application, the context restoration module needs to record restoration point information and the instruction stream number of the last rendering instruction stream executed by an electronic device. In this implementation, after receiving a rendering instruction stream, the context restoration module may parse and execute the rendering instruction stream in real time, and does not need to store a rendering instruction stream between two restoration points. Compared with the solution of Embodiment 1, storage space is saved, and the following problem is avoided: A rendering instruction stream is not executed in real time. In this implementation, the context restoration module can accurately identify an unexecuted rendering instruction stream each time recovery from a network jitter, and forward the rendering instruction stream to the app client for parsing and execution.

It should be noted that two sending modes are applied to the process of message exchange between the server and the terminal after recovery from the network jitter.

In one sending mode, the context tracking module no longer needs to send a context difference to the context restoration module, and a rendering instruction stream continues to be sent to the context restoration module by the app.

In the other sending mode, the app no longer sends a rendering instruction stream to the context restoration module, and the context tracking module forwards a rendering instruction stream.

Figure 14:
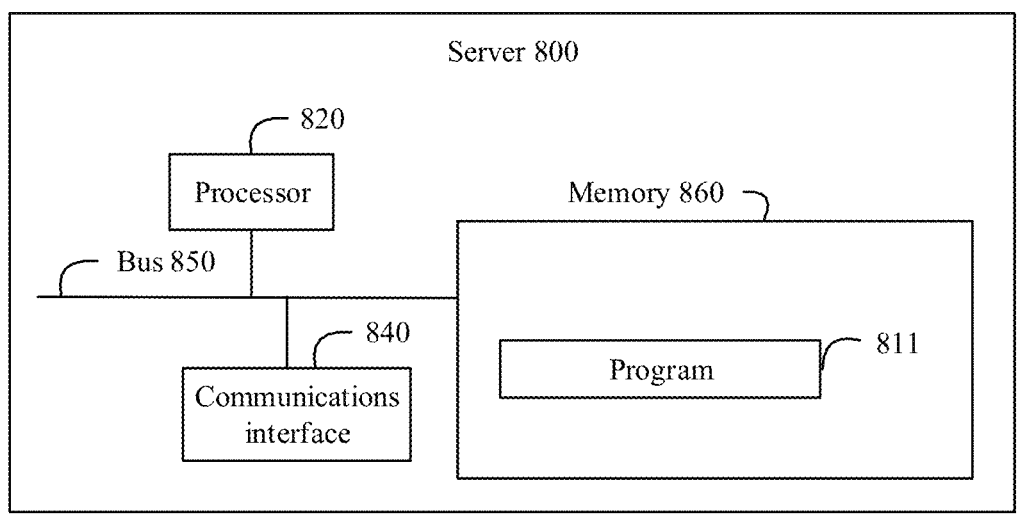
FIG. 14 is a schematic block diagram of a server according to an embodiment of this application.

FIG. 14 is a schematic block diagram of a server 800 according to an embodiment of this application. The server 800 includes a processor 820, a memory 860, a communications interface 840, and a bus 850. The processor 820, the memory 860, and the communications interface 840 communicate with each other by using the bus 850, or may implement communication by wireless transmission or by another means. The memory 860 is configured to store instructions, and the processor 820 is used to execute the instructions stored in the memory 860. The memory 860 stores program code 811, and the processor 820 may invoke the program code 811 stored in the memory 860 to perform the foregoing rendering method.

The memory 860 may include a read-only memory and a random access memory, and provide instructions and data to the processor 820. The memory 860 may further include a non-volatile random access memory. The memory 860 may be a volatile memory or a non-volatile memory, or may include a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory ( ), and is used as an external cache. Through example but not limitative description, a plurality of forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

The bus 850 may further include a power bus, a control bus, a status signal bus, and the like, in addition to a data bus.

It should be understood that the server 800 shown in FIG. 14 can implement the processes performed by the app and the context tracking module in the foregoing method embodiments. For details, refer to the description in the foregoing method embodiments. To avoid repetition, a detailed description is properly omitted herein.

Figure 15:
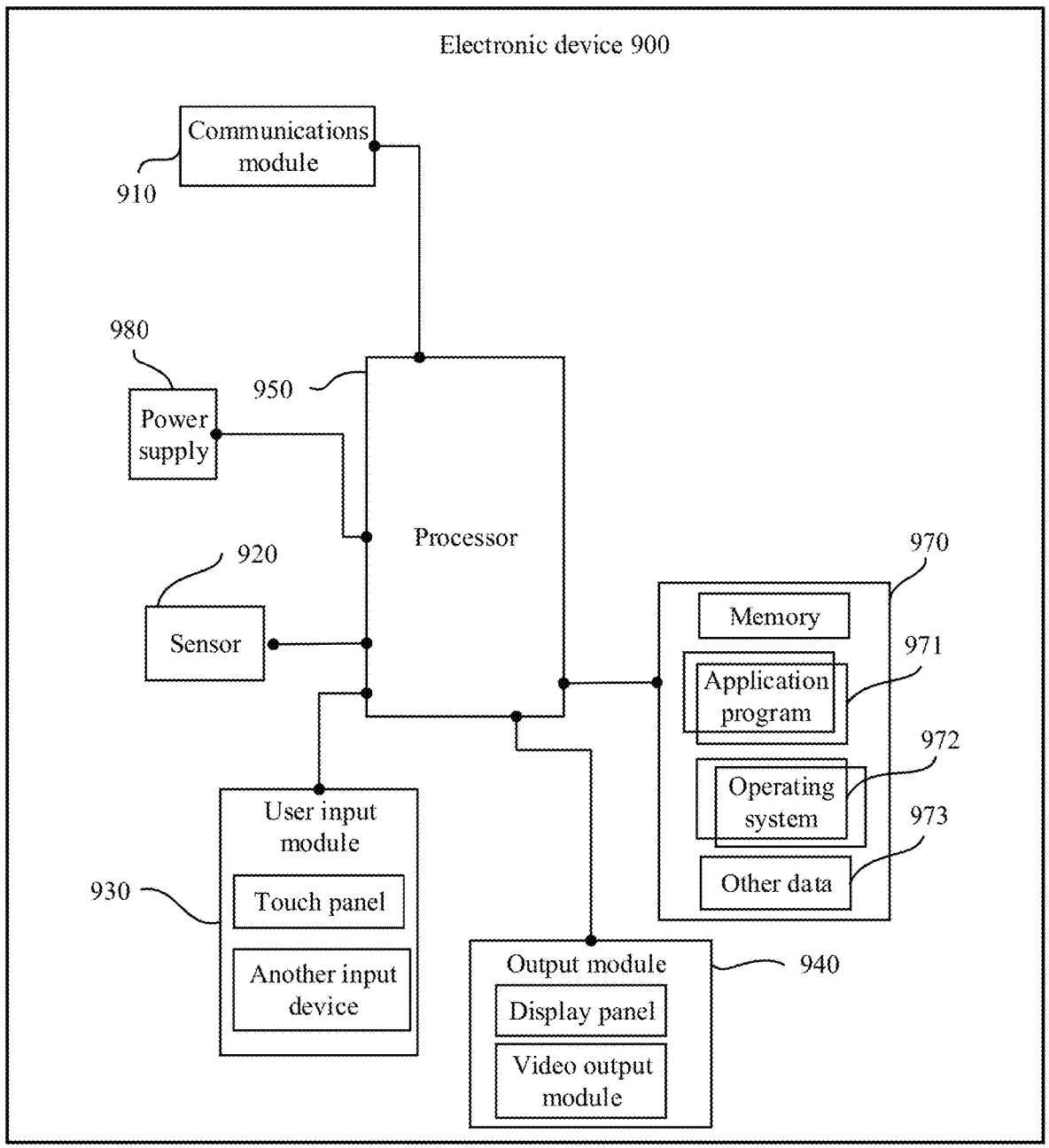
FIG. 15 is a schematic diagram of a structure of an electronic device according to an embodiment of this application.

FIG. 15 is a schematic diagram of a structure of an electronic device 900 according to an embodiment of this application. The electronic device 900 may be but is not limited to a laptop computer, a desktop computer, a mobile phone, a smartphone, a tablet computer, a multimedia player, an e-reader, a smart vehicle-mounted device, a smart household appliance, an artificial intelligence device, a wearable device, an Internet of things device, a virtual reality device/an augmented reality device/a hybrid reality device, or the like.

The electronic device 900 in FIG. 15 includes a communications module 910, a sensor 920, a user input module 930, an output module 940, a processor 950, a memory 970, and a power supply 980. The processor 950 may include one or more CPUs.

The electronic device shown in FIG. 15 may perform the steps of the graphics rendering method in embodiments of this application. Specifically, one or more CPUs in the processor 950 may perform the steps of the rendering method in embodiments of this application.

The following describes each module of the electronic device 900 in FIG. 15 in detail. It should be understood that the modules shown in FIG. 15 are merely examples for description. In a specific implementation, the electronic device 900 may include more or fewer modules.

The communications module 910 may include at least one module that can enable the electronic device to communicate with another electronic device. For example, the communications module 910 may include one or more of a wired network interface, a broadcast receiving module, a mobile communications module, a wireless Internet module, a local area communications module, and a location (or positioning) information module. Embodiments of this application set no limitation on a communications generation, for example, the communications generation may be 2G, 3G, 4G, 5G, or another communications generation that emerges with development of technologies.

For example, the communications module 910 can obtain, from a game server end in real time, a rendering instruction required for rendering a game picture.

The sensor 920 may sense some operations of a user, and the sensor 920 may include a distance sensor, a touch sensor, and the like. The sensor 920 may sense an operation such as touching a screen or approaching a screen by the user.

For example, the sensor 920 can sense some operations of the user on a game interface.

The user input module 930 is configured to: receive input digit information, character information, or a contact touch operation/contactless gesture; and receive signal input related to user setting and function control of a system. The user input module 930 includes a touch panel and/or another input device. For example, the user may control a game by using the user input module 3030.

The output module 940 includes a display panel, configured to display information entered by the user, information provided for the user, various menu interfaces of the system, and the like.

Optionally, the display panel may be configured in a form of a liquid crystal display (LCD), an organic light-emitting diode (OLED), or the like. In some other embodiments, the touch panel may cover the display panel to form a touch display screen.

In addition, the output module 940 may further include a video output module, an alarm, a tactile module, and the like. The video output module may display a game picture obtained after graphics rendering.

The power supply 980 may receive external power and internal power under control of the processor 950, and provide power required for running the modules in the electronic device.

The processor 950 may include one or more CPUs, and the processor 950 may further include one or more GPUs.

When the processor 950 includes a plurality of CPUs, the plurality of CPUs may be integrated into a same chip, or may be separately integrated into different chips.

When the processor 950 includes a plurality of GPUs, the plurality of GPUs may be integrated into a same chip, or may be separately integrated into different chips.

When the processor 950 includes both a CPU and a GPU, the CPU and the GPU may be integrated into a same chip.

For example, when the electronic device shown in FIG. 15 is a smartphone, one CPU and one GPU are usually related to image processing in a processor in the smartphone. The CPU and the GPU herein each may include a plurality of cores.

The memory 970 may store a computer program, and the computer program includes an operating system program 972, an application 971, and the like. A typical operating system is, for example, a system used in a tablet computer or a notebook computer, such as Windows of Microsoft or MacOS of Apple, and for another example, a system used in a mobile terminal, such as a Linux®-based Android (Android®) system developed by Google.

The memory 970 may be one or more of the following types: a flash memory, a memory of a hard disk type, a memory of a micro multimedia card type, a card-type memory (for example, an SD or XD memory), a random access memory (RAM), a static random access memory (static RAM, SRAM), a read-only memory (ROM), an electrically erasable programmable read-only memory (EEPROM), a programmable read-only memory (programmable ROM, PROM), a magnetic memory, a magnetic disk, or an optical disc. In some other embodiments, the memory 970 may be a network storage device on the Internet. The system may perform an operation such as updating or reading on the memory 970 on the Internet.

For example, the memory 970 may store a computer program (the computer program is a program corresponding to the graphics rendering method in embodiments of this application). When the processor 950 executes the computer program, the processor 950 can perform the graphics rendering method in embodiments of this application.

The memory 970 further stores other data 973 in addition to the computer program. For example, the memory 970 may store data in a processing process of the graphics rendering method in this application.

A connection relationship between the modules in FIG. 15 is only an example. The electronic device provided in any embodiment of this application may also be applied to an electronic device using another connection manner. For example, all modules are connected by using a bus.

A person of ordinary skill in the art may be aware that, in combination with the examples described in embodiments disclosed in this specification, units and algorithm steps can be implemented by electronic hardware or a combination of computer software and electronic hardware. Whether the functions are performed by using hardware or software depends on a particular application and a design constraint condition of the technical solutions. A person skilled in the art may use different methods to implement the described functions for each particular application, but it should not be considered that the implementation goes beyond the scope of this application.

All or a part of the foregoing embodiments may be implemented by using software, hardware, firmware, or any combination thereof. When the software is used to implement embodiments, all or a part of embodiments may be implemented in a form of a computer program product. The computer program product includes one or more computer instructions. When the computer program instructions are loaded and executed on a computer, the procedures or functions according to embodiments of this application are all or partially generated. The computer may be a general-purpose computer, a special-purpose computer, a computer network, or another programmable apparatus. The computer instructions may be stored in a computer-readable storage medium or may be transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The apparatus embodiment described above is merely an example. For example, the module division is merely logical function division. The units described as separate parts may or may not be physically separate. Some or all the modules may be selected based on actual needs to achieve the objectives of the solutions of embodiments. In addition, in the accompanying drawings of the apparatus embodiments provided in this application, modules may be communicatively connected by using one or more communications buses or signal lines. A person of ordinary skill in the art may understand and implement embodiments of the present invention without creative efforts.

The foregoing description is merely a specific implementation of this application, but is not intended to limit the protection scope of this application.

What is claimed is:

1. A rendering method, wherein the method is applied to a server and comprises:
    before a network jitter occurs on a network, successively receiving, by the server, operation instructions from an electronic device through the network, generating a plurality of first rendering instruction streams based on the operation instructions, and sending the plurality of first rendering instruction streams to the electronic device; and generating and storing, by the server, one or more first rendering contexts for one or more first rendering instruction streams in the plurality of first rendering instruction streams, wherein the one or more first rendering contexts one-to-one corresponds to the one or more first rendering instruction streams, and each of the one or more first rendering contexts comprises a corresponding first rendering instruction stream or information used for restoring the corresponding first rendering instruction stream;
    when the network jitter occurs, continuing, by the server, to generate a second rendering instruction stream based on received operation instructions, and generating and storing a second rendering context based on the second rendering instruction stream, wherein the second rendering context comprises the second rendering instruction stream or information used for restoring the second rendering instruction stream, and the second rendering instruction stream is a rendering instruction stream most recently generated before recovery from the network jitter; and
    after the recovery from the network jitter, sending, by the server, a set of rendering context differences to the electronic device, wherein the set of rendering context differences comprises one or more rendering context differences, wherein each of the one or more rendering context differences is a difference between the second rendering context and one of the first rendering contexts, and the electronic device uses the set of rendering context differences to obtain the second rendering instruction stream.

2. The method according to claim 1, wherein before the generating and storing any first rendering context in the one or more first rendering contexts, the method comprises:
    determining one of the plurality of first rendering instruction streams as a rendering instruction stream corresponding to data of an image frame; or
    determining one of the plurality of first rendering instruction streams as a target rendering instruction stream, wherein the target rendering instruction stream is pre-stored on the server.

3. The method according to claim 1, wherein an action of the generating and storing of one or more first rendering contexts is periodically performed.

4. The method according to claim 1, further comprising:
    generating, by the server, a third rendering instruction stream and generating a third rendering context based on the third rendering instruction stream, wherein the third rendering context comprises the third rendering instruction stream or information used for restoring the third rendering instruction stream, and the third rendering instruction stream is one of the plurality of first rendering instruction streams generated after the server receives the operation instructions from the electronic device; and
    setting a baseline snapshot, wherein the baseline snapshot is the third rendering context.

5. The method according to claim 4, further comprising:
    receiving a rendering instruction stream response sent by the electronic device, wherein the rendering instruction stream response comprises an instruction stream number of a rendering instruction stream most recently received by the electronic device, and updating the baseline snapshot to a first rendering context corresponding to the received instruction stream number.

6. The method according to claim 5, further comprising:
    after receiving the rendering instruction stream response, deleting other first rendering contexts of the one or more first rendering contexts stored on the server.

7. The method according to claim 4, wherein the storing of the one or more first rendering contexts comprises:
    storing a difference between one of the one or more first rendering context and the baseline snapshot.

8. The method according to claim 4, wherein the sending a set of rendering context differences comprises:
    sending a set of differences between the second rendering context and each first rendering context in the one or more first rendering contexts; or
    sending a set of differences between a difference between the second rendering context and the baseline snapshot, and a sum of differences between the any first rendering context and the baseline snapshot.

9. The method according to claim 1, wherein after recovery from the network jitter, the method further comprises:
    obtaining an instruction stream number of a rendering instruction stream last executed by the electronic device before the network jitter occurs; and
    the sending a set of rendering context differences comprises sending a difference between the second rendering context and a first rendering context corresponding to the instruction stream number.

10. A graphics rendering apparatus, wherein the graphics rendering apparatus comprises a memory and a processor, the memory is configured to store computer-readable instructions, and the processor executes the instructions to:
    before a network jitter occurs on a network, receive, by the server, operation instructions from an electronic device through the network, generate a plurality of first rendering instruction streams based on the operation instructions, and send the plurality of first rendering instruction streams to the electronic device; and generate and store, by the server, one or more first rendering contexts for one or more first rendering instruction streams in the plurality of first rendering instruction streams, wherein the one or more first rendering contexts one-to-one correspond to the one or more first rendering instruction streams, and each of the one or more first rendering contexts comprises a corresponding first rendering instruction stream or information used for restoring the corresponding first rendering instruction stream;
    when the network jitter occurs, continue, by the server, to generate a second rendering instruction stream based on received operation instructions, and generate and store a second rendering context based on the second rendering instruction stream, wherein the second rendering context comprises the second rendering instruction stream or information used for restoring the second rendering instruction stream, and the second rendering instruction stream is a rendering instruction stream most recently generated before recovery from the network jitter; and after the recovery from the network jitter, send, by the server, a set of rendering context differences to the electronic device, wherein the set of rendering context differences comprises one or more rendering context differences, wherein each of the one or more rendering context differences is a difference between the second rendering context and one of the first rendering contexts, and the electronic device uses the set of rendering context differences to obtain the second rendering instruction stream.

11. The graphics rendering apparatus according to claim 10, wherein the processor executes the instructions to:
determine one of the plurality of first rendering instruction streams as a rendering instruction stream corresponding to data of an image frame; or
determine one of the plurality of first rendering instruction streams as a target rendering instruction stream, wherein the target rendering instruction stream is pre-stored on the server.

12. The graphics rendering apparatus according to claim 10, wherein an action of the generating and storing of one or more first rendering contexts is periodically performed.

13. The graphics rendering apparatus according to claim 10, wherein the processor executes the instructions to:
generate a third rendering instruction stream and generating a third rendering context based on the third rendering instruction stream, wherein the third rendering context comprises the third rendering instruction stream or information used for restoring the third rendering instruction stream, and the third rendering instruction stream is one of the plurality of first rendering instruction streams generated after the server receives the operation instructions from the electronic device; and
set a baseline snapshot, wherein the baseline snapshot is the third rendering context.

14. The graphics rendering apparatus according to claim 10, wherein the processor executes the instructions to:
send a set of differences between the second rendering context and each first rendering context in the one or more first rendering contexts; or
send a set of differences between a difference between the second rendering context and the baseline snapshot, and a sum of differences between the any first rendering context and the baseline snapshot.

* * * * *

UNITED STATES PATENT AND TRADEMARK OFFICE
CERTIFICATE OF CORRECTION

| | | |
|---|---|---|
| PATENT NO. | : 12,179,098 B2 | Page 1 of 1 |
| APPLICATION NO. | : 17/895562 | |
| DATED | : December 31, 2024 | |
| INVENTOR(S) | : Xian Meng et al. | |

It is certified that error appears in the above-identified patent and that said Letters Patent is hereby corrected as shown below:

On the Title Page

In item (71), in "Applicant:", delete "GuangDong (CN)" and insert -- Shenzhen (CN) --.

Signed and Sealed this
Eighteenth Day of March, 2025

Coke Morgan Stewart
*Acting Director of the United States Patent and Trademark Office*